US008059839B2

(12) United States Patent
Aiso et al.

(10) Patent No.: US 8,059,839 B2
(45) Date of Patent: Nov. 15, 2011

(54) MIXING SYSTEM

(75) Inventors: Masaru Aiso, Hamamatsu (JP); Masaaki Okabayashi, Hamamatsu (JP); Atsuo Hamada, Hamamatsu (JP)

(73) Assignee: Yamaha Corporation (JP)

( * ) Notice: Subject to any disclaimer, the term of this patent is extended or adjusted under 35 U.S.C. 154(b) by 906 days.

(21) Appl. No.: 12/045,863

(22) Filed: Mar. 11, 2008

(65) Prior Publication Data

US 2008/0226099 A1 Sep. 18, 2008

(30) Foreign Application Priority Data

Mar. 12, 2007 (JP) ................................ 2007-061761

(51) Int. Cl.
*H04B 1/00* (2006.01)

(52) U.S. Cl. ......................................... 381/119; 700/94

(58) Field of Classification Search .................. 381/119; 700/94

See application file for complete search history.

(56) References Cited

FOREIGN PATENT DOCUMENTS

JP 7-122944 A 5/1995
JP 2005-277649 A 10/2005

*Primary Examiner* — Douglas Menz

(74) *Attorney, Agent, or Firm* — Rossi, Kimms & McDowell LLP

(57) ABSTRACT

Mixer and first and second engines are cascade-connected, and the second engine is connected to a speaker. In mode A, input signals to the first engine are output to the speaker via output channels of the second engine, and mixing operation of the first engine is performed via a console. Input signals to the second engine are output for monitoring via output channels of the first engine, and mixing control of the second engine is performed via a personal computer. In mode B, input signals to the second engine are output to the speaker via the output channels of the second engine, and mixing operation of the second engine is performed via the console. Input signals to the first engine are output for monitoring via the output channels of the first engine, and mixing control of the first engine is performed via the personal computer.

9 Claims, 11 Drawing Sheets

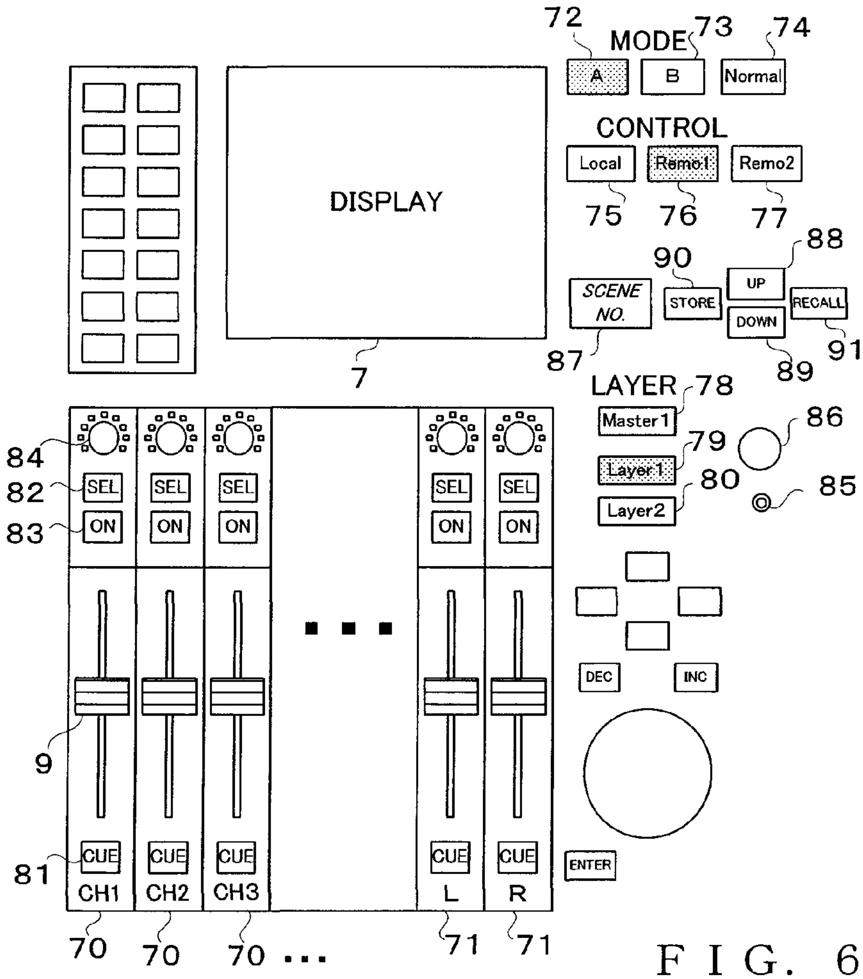

F I G. 6

LOCAL

| | MODE A & MODE B |
|---|---|
| Master1 | LOCAL OUTPUT CH1-CH24 |
| Layer1 | LOCAL INPUT CH1-CH24 |
| Layer2 | LOCAL INPUT CH25-CH48 |

F I G. 7A

REMOTE

| | MODE A | MODE B |
|---|---|---|
| Master1 | ENGINE B OUTPUT CH1-CH24 | ENGINE B OUTPUT CH1-CH24 |
| Layer1 | ENGIN A INPUT CH1-CH24 | ENGINE B INPUT CH1-CH24 |
| Layer2 | ENGINE A INPUT CH25-CH48 | ENGINE B INPUT CH25-CH48 |

F I G. 7B

| LOCAL | REMOTE |
|---|---|
| MODE A & MODE B | MODE A & MODE B |
| LOCAL ST OUTPUT CH1-CH2 | ENGINE B ST OUTPUT CH1-CH2 |

F I G. 7C

| MODE A | MODE B |
|---|---|
| ENGINE B INPUT CH1-CH48<br>ENGINE A OUTPUT CH1-CH24<br>ST OUTPUT CH1-CH2 | ENGINE A INPUT CH1-CH48<br>OUTPUT CH1-CH24<br>ST OUTPUT CH1-CH2 |

F I G. 7D

MIXING SYSTEM

BACKGROUND

The present invention relates generally to an audio mixing system comprising a plurality of cascade-connected mixing apparatus, and more particularly to an improved method for controlling the individual mixing apparatus in the mixing system.

Audio mixers are apparatus which perform mixing processing, such as mixing of audio signals of a plurality of channels and impartment of effects to the audio signals. In recent years, digital mixers have been in wide-spread use, which convert analog audio signals, input via input devices such as microphones, into digital signals and then perform mixing processing on the converted digital signals. In each of these digital mixers, a human operator (or user) of the mixer sets values of mixing processing parameters via an operation section (or console section) that is provided with a multiplicity of operators operable to manipulate various parameters to be used in mixing processing. The current settings (set values) of the various mixing processing parameters are stored in a storage area called "current memory". DSP array (i.e., signal processing section) carries out the mixing processing on the basis of the various parameter settings held in the current memory.

The conventionally-known digital mixers can collectively reproduce settings of given mixing parameters by storing in advance, as a scene, the current settings of the parameters, held in the current memory, in a scene memory and then recalling the stored scene from the scene memory to the current memory. Such a function is commonly called "scene store/recall" function, and scene data of a plurality of scenes can be stored in the scene memory in the conventionally-known digital mixers.

In event venues, such as a music festival where a plurality of human performers exhibit performances (music performances etc.) in turn on the stage, it has been known to achieve a smooth progression of performances on the stage by providing two sets of performance platforms, which performers mount, and mixers which mix music performances executed on the performance platforms and alternately using the provided two sets. FIG. 19 shows an example of a conventionally-known PA system including two performance platforms, "platformA" 400*a* and "platformB" 400*b*. In the illustrated example of FIG. 19, a mixer ("mixA") 410 is provided in correspondence with "platformA" 400*a*, and mixing of a music performance on "platformA" is performed by the mixer 410. Mixer ("mixB) 411 is provided in correspondence with "platformB" 400*b*, and mixing of a music performance in "platformB" is performed by the mixer 411.

Output signals of "mixA" 410 and "mixB" 411 are supplied to an output switch device ("SW") 412, which selectively outputs either the output signals of "mixA" 410 or the output signals of "mixB" 411 to an amplifier 500 so that audio signals corresponding to the selection by the output switch device 412 are audibly generated or sounded through a speaker 600. During the course of actual execution or exhibition, on the stage, of a particular performance assigned to "platformA" 400*a*, for example, the system of FIG. 19 permits preparations (such as mixing processing, sound check and the like) for a succeeding performance assigned to the other platform ("platformB") 400*b* while allowing audio signals of the performance of "platformA" 400*a* (i.e., output signals of "mixA" 410) to be sounded via the speaker 600.

Generally, in an event venue and the like, the mixers ("mixA" and "mixB") 410 and 411 are installed in a mixing booth provided in an audience seating area, as shown in FIG. 19. This is for the purpose of allowing a user (human operator) of the mixers to perform desired mixing operation while aurally checking or confirming balance between audio signals audibly reproduced or sounded through the speaker 600 to the audience. As well known, a plurality of channel strips for processing audio signals on a channel-by-channel basis are provided on the operation panel (console section) of the mixer. The greater the processing capability (i.e., number of channels) of the mixer for use in a concert venue or the like, the greater would become the physical size of the body, including the console section, of the mixer. Consequently, the conventionally-known PA system illustrated in FIG. 19 would present the inconvenience that much of the space in the audience seating area is occupied with the two mixers 410 and 411.

Further, in the conventionally-known PA system, thick and heavy audio cables 413 called "multi cables", each comprising a bundle of a plurality of cables, are installed between acoustic equipment on the stage-side performance platforms 400*a* and 400*b* and the audience-seat-side mixers 410 and 411. Further, a stereo audio cable 414 for delivering stereo signals is installed between the output switching device 412 and the amplifier 500. Namely, a plurality of the audio cables 413 and the stereo audio cable 414 have to be installed or run over a long distance between the stage-side positions and the audience-seat-side positions. Particularly, in the conventionally-known PA system, the necessary wiring work is very complicated and cumbersome because the multi cables 413 are thick and heavy and hence very difficult to handle and it is necessary to branch audio signals of a plurality of channels, channel by channel, via a connection device (i.e., connector box) disposed near the mixers and couple the audio signals from the connection box to individual input sections of a plurality channels of the mixers. Further, because the multi cables are relatively expensive, the conventionally-known PA system presents the inconvenience of high wiring cost.

Further, in the conventionally-known PA system, desired mixing operation is performed separately on each of the mixers 410 and 411. It has been considered convenient if the mixing operation could be performed on the mixers 410 and 411 alternately via the console section of one of the mixers. Among the conventionally-known techniques for controlling mixing operation on a plurality of mixers via the console section of one of the mixers is one disclosed, for example, in Japanese Patent Application Laid-open Publication No. 2005-277649 (hereinafter referred to as Patent Literature 1), which is arranged to not only expand the number of input channels of a plurality cascaded mixers by interconnecting respective buses but also allow settings of some parameters (e.g., scene recall instruction) to be interlocked or interlinked between the mixers. However, with the technique disclosed in Patent Literature 1, what can be controlled in an interlocked manner are limited to only some parameters (e.g., scene recall instruction), and it is impossible to control channel-specific mixing processing parameters of a given one of the mixers via the console section of another of the mixers.

Further, from Japanese Patent Application Laid-open Publication No. HEI-7-122944 (hereinafter referred to as Patent Literature 2), for example, there has been known a function for recalling parameter settings of a scene, stored in a scene memory, to the console section of a mixer while retaining a state of mixing currently performed by an internal DSP array of the mixer (i.e., stored contents of a current memory in the mixer), and then allowing the console section to confirm or edit the individual parameter settings.

If the technique disclosed in Patent Literature 2 is applied to the system of FIG. 19, it will be possible to perform control on audio signals, currently sounded through the speaker of a mixer, on the basis of a state of mixing being executed by an internal DSP array of the mixer and simultaneously recall, to the console section of the mixer, mixing processing parameter settings for a next or succeeding performance, prepared in another mixer, to then adjust the recalled settings. However, with the technique disclosed in Patent Literature 2, even if the console section adjusts the mixing processing parameter settings for the succeeding performance, the adjusted results can not be reflected in the control by the internal DSP array of the other mixer because the adjusted results can not be returned to the other mixer, and sounds corresponding to the adjusted results can not be aurally checked or confirmed in the other mixer as well as in the one mixer. Thus, even with the technique disclosed in Patent Literature 2, preparations (mixing operation, sound check, etc.) for the succeeding performance in the other mixer can not be made through operation on the console section of the one mixer.

SUMMARY OF THE INVENTION

In view of the foregoing, it is an object of the present invention to allow mixing operation of a plurality of mixing apparatus to be performed efficiently. More specifically, it is an object of the present invention to provide an improved mixing system which allows mixing operation of two mixing apparatus to be efficiently performed alternately in an event venue and the like.

In order to accomplish the above-mentioned object, the present invention provides an improved mixing system including a plurality of cascaded mixing apparatus, which comprises: a main mixing apparatus including an main operation section for receiving operation by a user; a first mixing apparatus to which are inputted audio signals from a first input source; a second mixing apparatus to which are inputted audio signals from a second input source; an auxiliary operation section for receiving operation by the user different from the operation received via said main operation section; a main output section that outputs an audio signal to a sound system; an auxiliary output section that outputs a confirming audio signal; a mode selection section that selects either one of a first control mode for causing the signal of said first input source to be outputted through said main output section and a second control mode for causing the signal of said second input source to be outputted through said main output section; a first control section that, in said first control mode, controls mixing processing of said first mixing apparatus for mixing the audio signals, inputted from the first input source, in response to operation received via said main operation section, to thereby cause a result of the controlled mixing processing of said first mixing apparatus to be outputted through said main output section and controls mixing processing of said second mixing apparatus for mixing the audio signals, inputted from the second input source, in response to operation received via said auxiliary operation section, to thereby cause a result of the controlled mixing processing of said second mixing apparatus to be outputted through said auxiliary output section; and a second control section that, in said second control mode, controls the mixing processing of said second mixing apparatus for mixing the audio signals, inputted from the second input source, in response to operation received via said main operation section, to thereby cause a result of the controlled mixing processing of said second mixing apparatus to be outputted through said main output section and controls the mixing processing of said first mixing apparatus for mixing the audio signals, inputted from the first input source, in response to operation received via said auxiliary operation section, to thereby cause a result of the controlled mixing processing of said first mixing apparatus to be outputted through said auxiliary output section.

According to the mixing system of the present invention, in the first control mode, the mixing processing of the first mixing apparatus is controlled in response to the operation received via the main operation section so that the result of the thus-controlled mixing processing of the first mixing apparatus can be outputted through the main output section, and the mixing processing of the second mixing apparatus is controlled in response to the operation received via the auxiliary operation section so that the result of the mixing processing of the thus-controlled second mixing apparatus can be outputted through the auxiliary output section. In the second control mode, on the other hand, the mixing processing of the second mixing apparatus is controlled in response to the operation received via the main operation section so that the result of the thus-controlled mixing processing of the second mixing apparatus can be outputted through the main output section, and the mixing processing of the first mixing apparatus can be controlled in response to the operation received via the auxiliary operation section so that the result of the thus-controlled mixing processing of the first mixing apparatus can be outputted through the auxiliary output section.

Thus, in an event venue or the like, where switching is made per performance between two mixing apparatus to allow the two mixing apparatus to be used alternately, audio signals for a current performance are input to either one of the first and second mixing apparatus and mixing control is performed on the input audio signals for the current performance, in response to operation received via the main operation section, so that the result of the thus-controlled mixing processing is outputted through the main output section for sounding through a main speaker, during which time audio signals for a next or succeeding performance are input to the other of the first and second mixing apparatus and mixing control is performed on the input audio signals for the succeeding performance, in response to operation received via the auxiliary operation section, so that the result of the thus-controlled mixing processing can be outputted through the auxiliary output section for aural check or confirmation via a headphone set or the like. Because switching can be readily made between the first and second control modes in accordance with the input destination (first or second mixing apparatus) of the audio signals for the current performance, two different mixing processing can be performed efficiently using the main operation section of the main mixing apparatus.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which:

FIGS. 5A and 5B are block diagrams showing examples of audio signal processing constructions to be used when the embodiment of the mixing system should operate in a "festival mode", of which FIG. 5A shows an example audio signal processing construction to be used in a "festival A mode" while FIG. 5B shows an example audio signal processing construction to be used in a "festival B mode";

FIG. 6 is a view showing an example construction of a console section of a mixer included in the embodiment of the mixing system;

FIGS. 7A-7D are diagrams explanatory of assignment, to channel strips, of objects of control when the embodiment of the mixing system should operate in the "festival mode", of which FIG. 7A shows assignment, to monaural channel strips, of objects of control in local control, FIG. 7B shows assignment, to monaural channel strips, of objects of control in remote control, FIG. 7C shows assignment, to stereo output channel strips, of objects of control, and FIG. 7D shows assignment of objects of remote control by a PC;

FIGS. 13A and 13B are views explanatory of examples of parameter editing processes based on remote control when the embodiment of the mixing system should operate in the festival mode, of which FIG. 13A shows a parameter editing process in "mode A" while FIG. 13B shows a parameter editing process in "mode B";

FIGS. 16A and 16B are diagrams explanatory of control for interlocking a scene store/recall function in the embodiment of the mixing system, of which FIG. 16A shows such control in the "normal mode" while FIG. 16B shows such control in the "festival A mode";

DETAILED DESCRIPTION

With reference to the accompanying drawings, a detailed description will be given about a mixing system according to an embodiment of the present invention. Of a plurality of mixing apparatus constituting the embodiment of the mixing system, the mixing apparatus having a console section (i.e., operation panel or operation section) will hereinafter be referred to as "digital audio mixer" or "mixer", while each of the other mixing apparatus having no console section will hereinafter be referred to as "mixer engine" or "engine".

Figure 1:
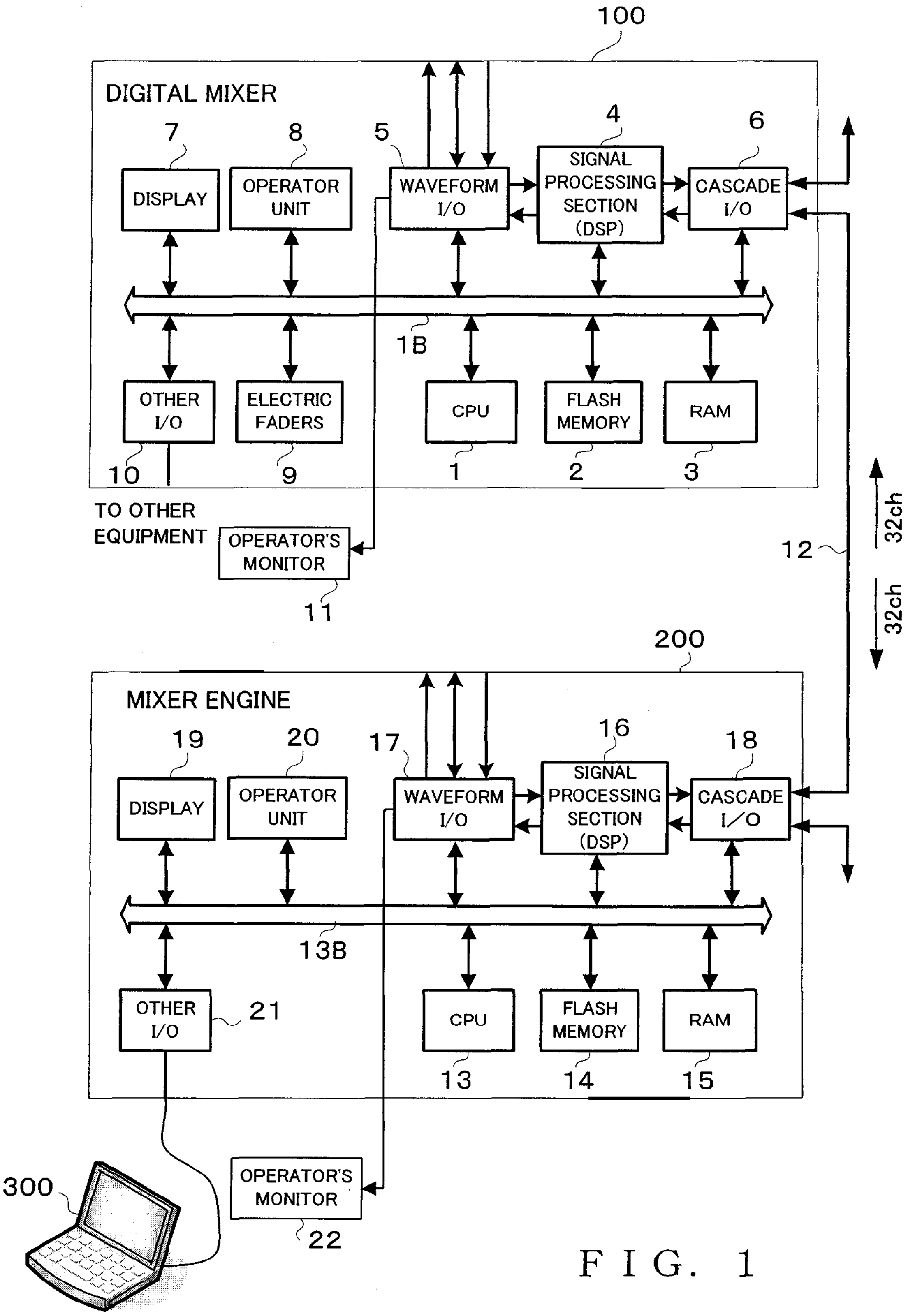
FIG. 1 is a block diagram showing example electric hardware setups of a digital audio mixer and mixer engine constituting a mixing system according to an embodiment of the present invention.

FIG. 1 is a block diagram showing example electric hardware setups of the digital audio mixer and mixer engine constituting the mixing system of the present invention. The instant embodiment of the mixing system comprises at least one mixer 100 and at least one mixer engine 200 which are cascade-connected with each other.

As shown in FIG. 1, the mixer 100 includes a CPU 1, a flash memory 2, a RAM 3, a signal processing (DSP) section 4, a waveform input/output interface (waveform I/O) 5, a cascade interface (cascade I/O) 6, a display 7, an operator member unit 8, electric faders 9, and an other interface section 10; these components 1-10 are interconnected via a bus 1B. Microcomputer, comprising the CPU 1, flash memory 2 and RAM 3, executes a control program, stored in the flash memory 2 or RAM 3, to control all operations of the mixer 100. The RAM 3 includes a current memory area for storing the current settings of various parameters for mixing processing.

The signal processing section 4 comprises a DSP array for performing digital signal processing on audio signals. The waveform I/O 5 includes an analog input port, analog output port and digital input/output ports, and each analog audio signal input via the waveform I/O 5 is converted into a digital audio signal and then supplied to the DSP array 4. The DSP array 4 performs signal processing on the supplied digital audio signal on the basis of an instruction given from the CPU 1, and the digital audio signal generated as a result of the signal processing by the DSP array 4 is then converted into analog representation and output via the waveform I/O 5. The DSP array 4 also communicates digital audio signals with digital acoustic equipment connected thereto via the waveform I/O 5. Further, a monitor (e.g., headphone set) 11 for a user or human operator of the mixer 100 outputs monitoring audio signals supplied from the waveform I/O 5.

The display 7, operator member unit 8 and electric faders 9 are user interfaces that constitute the console section (indicated at 60 in FIG. 4) operable by the user or human operator of the mixer 100, and these user interfaces 7-9 are provided on the upper surface of the console section 60 of the mixer 100.

The electric faders 9 are operator members operable to continuously vary values of parameters allocated thereto in accordance with operating positions of corresponding vertically-slidable knobs. The electric faders 9 are provided on, and in one-to-one corresponding relation to, a plurality of channel strips (see FIG. 6) on the console section 60. Each of the electric faders 9 has a motor built therein for automatically driving the knob to vary the operating position of the knob; namely, the motor can be driven as necessary under the control of the CPU 1 to automatically vary the knob position of the electric fader 9. By the operating position of the knob, the current value of the parameter allocated to the electric fader 9 can be visually indicated to the user. The display 7, which is in the form of a liquid crystal display (LCD) panel and/or the like, displays various information to the user under the control of the CPU 1. Further, the operator member unit 8 includes a multiplicity of operator members operable to, for example, set various parameters, switch among various operation modes and instruct activation of various functions.

The mixer 100 is cascade-connected (cascaded) with another mixing apparatus (mixer or mixer engine) via the cascade I/O 6. In the instant embodiment, a general-purpose LAN cable 12, such as a CAT5 cable, may be used to cascade the mixing apparatus. Between the cascaded mixing apparatus, audio signals and remote control signals of a plurality of channels can be delivered bi-directionally by use of a communication protocol, such as the EtherSound (registered trademark) or CobraNet (registered trademark) protocol, capable of communicating audio signals and remote control signals of a plurality of channels via one LAN cable. In the instant embodiment, it is assumed that the EtherSound (registered trademark) protocol is used as the communication protocol. With the EtherSound protocol, bi-directional data communication can be performed per Ethernet frame that comprises a packet containing audio signals of 64 channels (e.g., 32 channels for upstream communication and 32 channels for downstream communication). The aforementioned remote control signals include signals instructing changes in values or settings of various parameters related to mixing processing to be performed by the other mixing apparatus cascaded with the mixer 100, information indicative of the changed results, etc. Namely, the mixer 100 can transmit and receive, to and from the cascaded other mixing apparatus, control signals including ones instructing changes of various parameters values or settings pertaining to the mixing processing, information indicative of the changed results, etc.

The other interface section 10 may include various interfaces for connection with other equipment, such as a personal computer (PC), external MIDI equipment, recorder, USB memories, etc. PC containing an application program for controlling the mixer 100 can be connected to the other interface section 10, so as to control the mixer 100 from the PC.

The mixer engine 200 is similar in signal-processing-related hardware setup to the aforementioned mixer 100 but different from the mixer 100 in that it has no console section for the user to perform mixing operation. Namely, the mixer engine 200 includes: a microcomputer comprising a CPU 13, a flash memory 14 and RAM 15; a DSP array 16 for performing mixing processing; a waveform I/O 17 for inputting and outputting audio signals; and a cascade I/O 18 for connection with other equipment including the mixer 100. The above-mentioned components 13-18 are interconnected via a bus 13B. Further, a monitor 22 for a user or human operator of the mixer engine 200 outputs monitoring audio signals supplied from the waveform I/O 17. Display 19 and operator member unit 20 shown in FIG. 1 as components of the mixer engine 200 are in the form of extremely simple LED lamps, switches, etc., which do not constitute a console section of a mixer.

The engine 200 is cascaded with other mixing apparatus, including the mixer 100, via the LAN cable 12 connected to the cascade I/O 18. In the engine 200, remote control signals transmitted from the mixer 100 are received via the cascade I/O 18, the DSP arrays 16 performs mixing-processing-related control, such as changes in values of various parameters on the basis of the received control signals, and the results of the mixing-processing-related control, such as changes in value of various parameters, can be returned to the mixer 100 via the cascade I/O 18.

Furthermore, a PC 300 containing an application program for controlling the mixer engine 200 via an other I/O section 21. The other I/O section 21 may include, for example, a serial port like RC-232C, and/or one or more other interfaces compliant with any of the conventionally-known communication standards, such as USB, IEEE1394 and Ethernet. As conventionally known, the PC 300 can execute the application program for controlling the mixer engine 200, generate the above-mentioned remote control signals in response to operation of a user interface of the PC 300 and supply the control signals to the engine 200 to control the engine 200. In this case, the PC 300 and the engine 200 together can operate as an independent mixer, even if they are not cascaded. The engine 200 is controlled by the PC 300 via an operation screen on the display of the PC 300. The operation screen, which emulates a construction of the mixer console section shown in FIG. 6, includes a plurality of channel strips, and parameter-setting GUI components, such as a fader operator, CUE instructing button, etc. provided for each of the channel strips.

Figure 2:
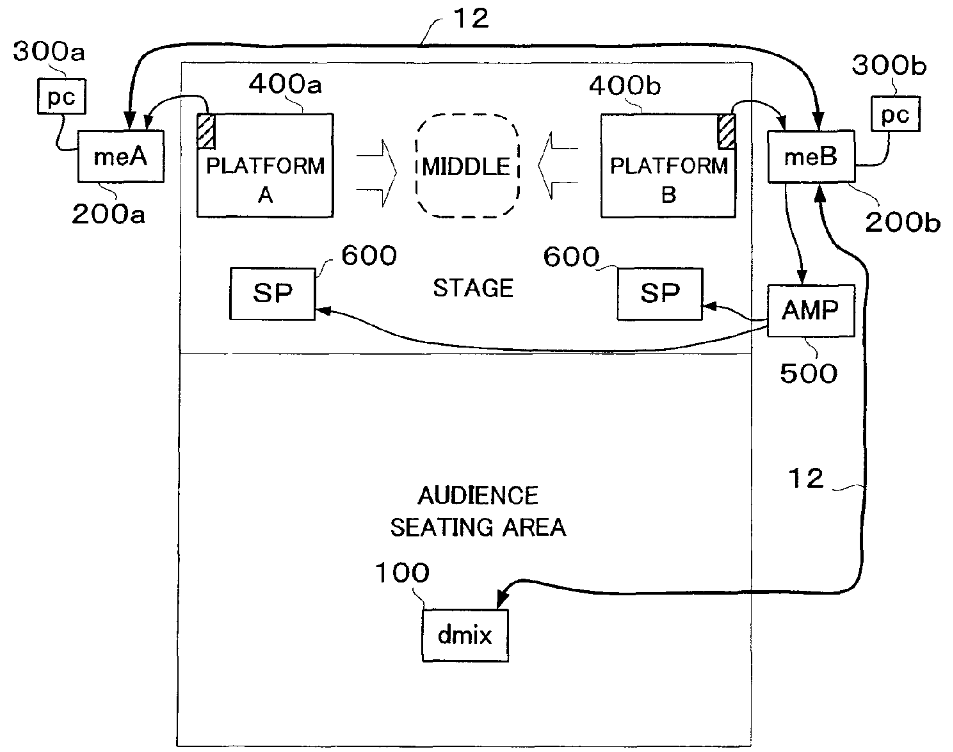
FIG. 2 is a block diagram schematically showing an example construction of a PA system including the embodiment of the mixing system.

FIG. 2 schematically shows an example construction of a PA system including the instant embodiment of the mixing system. The PA system shown in FIG. 2 is assumed to be one that is built in a music festival venue or the like where performances (such as music performances) by a plurality of human performers are exhibited. In the illustrated example of FIG. 2, a mixer ("dmix") 100, engine ("meA") 200*a* and engine ("meB") 200*b* are cascaded with one another via general-purpose LAN cable (e.g., CAR5 cable) 12. Between the mixing cascaded apparatus, audio signals and remote control signals of a plurality of channels can be delivered bi-directionally by use of the EtherSound (registered trademark).

In FIG. 2, reference numerals 400*a* and 400*b* represent two performance platforms (i.e., "platformA" and "platformB") each provided for mounting thereon a set of human performers, such as human music performers. The engine ("meA") 200*a* is disposed near the performance platform ("platformA") 400*a* and connected via an audible cable with acoustic equipment (first input source) provided on the performance platform 400*a*. Similarly, the engine ("meB") 200*b* is disposed near the performance platform ("platformB") 400*b* and connected via an audible cable with acoustic equipment (second input source) provided on the performance platform 400*b*. Further, a sound system including an amplifier 500 and stereo speakers 600 is connected to the engine ("meB") 200*b*, and audio signals output via an audio signal output path (waveform I/O 17) of the engine 200*b* are amplified as necessary by the amplifier 500 and then audibly generated or sounded from the speakers 600 toward the audience. Further, PCs 300*a* and 300*b* may be connected to the engines 200*a* and 200*b* to control the engines 200*a* and 200*b* from the PCs 300*a* and 300*b*. Let it be assumed that the PCs 300*a* and 300*b* are located, for example, on the left and right wings of the stage near the engines 200*a* and 200*b*.

As shown in FIG. 2, the mixer ("dmix") 100 is displaced in a mixing booth installed at a suitable position, such as a rear position of the audience seating area, in a music festival venue or the like. In the mixing booth, the user of the mixer 100 can perform mixing operation while aurally checking or confirming balance between audio signals sounded from the sound system toward the audience seating area. The engines ("meA" and "meB") 200*a* and 200*b* are located on the sides of the stage near the respective performance platforms 400*a* and 400*b*. Here, the mixer 100, engine 200*a* and engine 200*b* are interconnected via the single LAN cable 12. In this type of music festival venue or the like, it has been conventional to use thick and heavy audio cables, called "multi cables", as the cables interconnecting the equipment located on the stage and mixing apparatus located in the mixing booth. Thus, heretofore, one or more multi cables have to be run over a long distance between the stage-side positions and the mixing booth in the audience seating area, and such wiring work is very complicated and cumbersome and tends to require high cost. In the mixing system shown in FIG. 2, on the other hand, it is sufficient that only one general-purpose LAN cable 12 be run for cascade connection among the audience-seat-side mixer 100, stage-side engine 200*a* and stage-side engine 200*b*. Thus, the necessary wiring work for the mixing system of FIG. 2 can be dramatically simplified as compared to that in the conventional counterparts. Further, because the LAN cable is very inexpensive as compared to the multi cable, the necessary wiring cost can be extremely lowered.

The following lines describe how the two performance platforms 400*a* and 400*b* are used in an event, such as a music festival, where a plurality of performances (such as music performances) are exhibited in succession on the stage. One of the two performance platforms 400*a* and 400*b* (e.g., "platformB") is moved to the middle of the stage so that a given performance is exhibited on the performance platform ("platformB") 400*b* on the stage, during which time preparations for a succeeding performance are made on the other performance platform ("platformA") 400*a* kept standby on one of the wings of the stage. Namely, while the current performance is being exhibited on the stage, the engine 200*a* is used to perform mixing setting, sound check. etc. for the succeeding performance assigned to "platformA" 400*a*. Then, upon completion of the current performance, "platformB" 400*b* having so far been in the middle of the stage is moved back to the other wing of the stage, and "platformA" 400*a* having so far been kept standby on the one wing of the stage is moved to the middle of the stage. After that, a given performance is exhibited on "platformA" 400*a*, during which time preparations for another succeeding performance are made on "platformB" 400*b* now kept standby on the wing of the stage. In this way, the two performance platforms 400*a* and 400*b* are used alternately, so that performances (e.g., music performances) can be executed on the stage in succession smoothly in the event, such as a music festival.

In the instant embodiment of the mixing system, desired mixing operation related to performances on "platformA" 400*a* and desired mixing operation related to performances on "platformB" 400*b* can be remote-controlled alternately via the console section 60 of the single mixer 100, in accordance with desired usage of the mixing system in the event. Namely, the mixer ("dmix") 100 is equipped with a special operation mode (hereinafter referred to as "festival mode") for performing the aforementioned remote control.

In the "festival mode", audio signals for a performance to be exhibited on the stage are input to one of the engines (200*a* or 200*b*), mixing processing on the input audio signals in the one engine is remote-controlled via the console section 60 of the mixer 100, and the results of the mixing processing are sounded through the sound system (speakers 600). Also, in the "festival mode", audio signals for a succeeding performance are input to the other audio signal (200*b* or 200*a*), mixing processing on the input audio signals in the other engine is remote-controlled via the PC (300*b* or 300*a*), and the results of the mixing processing can be monitored by the human operator of the PC via the monitor, such as a headphone set. Namely, in the "festival mode", the console section 60 of the mixer 100 functions as a "main operation section" for controlling the mixing processing on the audio signals for the performance to be exhibited on the stage, while the PC (300*a* or 300*b*) functions as an "auxiliary operation section" for controlling the mixing processing on the audio signals for the succeeding performance. Furthermore, an output path via which the audio signals for the performance to be exhibited on the stage are output to the sound system in the festival mode will hereinafter be referred to as "main output path" or "main output", while the audio signals via which the audio signals for the succeeding performance are output to the operator's monitor (11 or 22 in FIG. 1) in the festival mode will hereinafter be referred to as "auxiliary output path" or "auxiliary output".

In addition to the "festival mode", the mixer (dmix) 100 also has an operation mode in which corresponding buses of "dmix" 100, "meA" 200*a* and "meB" 200*b* cascaded with one another in an ordinary manner are interconnected to expand the number of input channels; such an operation mode will hereinafter be referred to as "normal mode".

Figure 3:
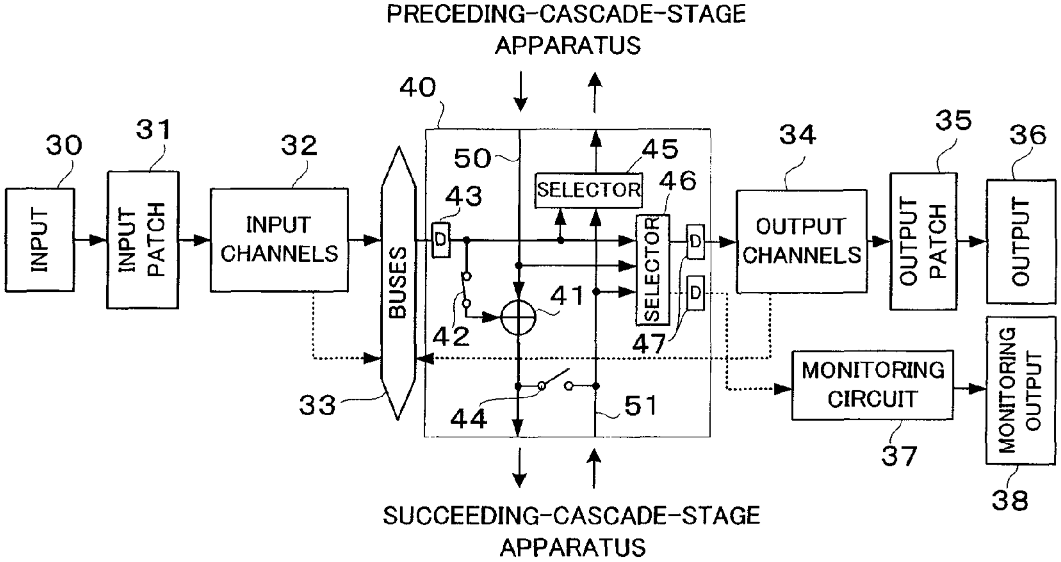
FIG. 3 is a block diagram showing an example algorithm construction of a representative one of mixing apparatus constituting the embodiment of the mixing system.

FIG. 3 shows an example signal processing algorithm construction of a representative one of the mixing apparatus in the instant embodiment of the mixing system. In the illustrated example, it is assumed that the individual mixing apparatus (mixer 100 and engines 200*a* and 200*b*) in the mixing system are identical to one another in signal processing algorithm (i.e., in terms of the number of input channels, number of buses, number of output channels, number of effects, and the like).

In FIG. 3, an audio signal input section 30 includes audio input ports of a plurality of channels that receive analog and digital audio signals of a plurality of channels from external acoustic equipment connected to the individual audio input ports. The received analog audio signals are converted in the audio signal input section 30 to digital audio signals. Input patch section 31 allocates each of the input signals to any one of a plurality of input channels 32 provided at the next stage. In the specification, connecting input ports to input channels or connecting output channels to output ports is referred to as "patch". Further, data indicative of a patch setting between an input port and an input/output channel will be referred to as "patch data", and such patch data is stored in a suitable memory, such as the flash memory or RAM.

Each of the mixing apparatus (mixer 100 and engines 200*a* and 200*b*) includes the plurality of input channels 32. In the instant embodiment, it is assumed that each of the mixing apparatus (mixer 100 and engines 200*a* and 200*b*) includes 48 input channels 32 (assigned channel numbers "CH1"-"CH48"). Each of the plurality of input channels 32 controls characteristics (sound volume level setting, parameter settings of various effectors, etc.) of the input digital audio signal, on the basis of parameter settings specific to the input channel.

Each of the plurality of input channels 32 is connected to each of a predetermined plurality of buses 33. Each of the buses 33 is assigned a unique bus number, and a signal of each of the input channels 32 can be output to a desired one of the buses 33 by designating the unique bus number of the desired bus 32. The plurality of buses 33 include a plurality of mixing buses (in this example, 24 monaural mixing buses and a pair of left and right stereo mixing buses), and two types of CUE buses (main CUE bus and auxiliary CUE bus). Each of the mixing buses is a bus for mixing the input audio signals at a mixing ratio corresponding to signal output levels of the individual input channels. Each of the CUE buses is a bus for outputting the audio signal of a user-designated channel directly to a monitoring output; the main CUE bus is a bus for outputting the audio signals of the main output in the festival mode directly to the monitoring output of the mixer 100, while the auxiliary CUE bus is a bus for outputting the audio signals of the auxiliary output in the festival mode to the monitoring output of the engine 200*a* or 200*b*.

In each of the plurality of output channels 34, control is performed on characteristics (sound volume level setting, parameter settings of various effectors) of the audio signal supplied thereto. The plurality of output channels 34 are provided in one-to-one corresponding relation to the plurality of buses 33. Namely, the plurality of output channels 34 include 24 monaural output channels and a pair of left and right stereo output channels, and each of the output channels 34 is supplied, via a later-described cascade control section 40, with the audio signal output from a corresponding one of the mixing buses 33. Output patch section 35 allocates, on the basis of output patch data, the output signal of each of the output channels 34 to any one of a plurality of analog or digital output ports provided in an audio output section 36. In this way, audio signals having been subjected to user-desired mixing processing can be output through the audio output section 36.

Monitoring circuit 37 is a circuit for outputting confirming (monitoring) signals to a monitoring output section 38. Normally (i.e., when the CUE is OFF), the monitoring circuit 37 outputs the audio signals from the output circuit 36 to the monitoring output section 38. When the user designates the audio signal of a particular channel as an object of CUE (i.e., when the CUE is ON), the monitoring circuit 37 outputs the audio signal of the particular channel (i.e., CUE signal) to the monitoring output section 38. In FIG. 3, a flow of the CUE signal is indicated by dotted lines. The user can set CUE ON or CUE OFF for each of the plurality of input channels 32 and output channels 34. The audio signal of the channel, for which CUE ON has been instructed, is output to the CUE bus of the plurality of buses 33, and the audio signal of the CUE bus is supplied to the monitoring circuit 37 via the later-described cascade control section 40 and then ultimately output via the monitoring output section 38. Note that the user can select, for each of the channels, either a pre-fader signal having not yet been subjected to sound volume adjustment by the sound volume fader or a post-fader signal having been subjected to sound volume adjustment by the sound volume fader, as a CUE signal to be sent from the input channel 32 or output channel 34 to the CUE bus.

In FIG. 3, the cascade control sections 40, indicated by a one-dash-dot line block, are provided in corresponding relation to the plurality of buses 33; in the figure, only a representative one of the cascade control sections 40, which corresponds to one of the buses 33, is shown for clarity of illustration.

In the cascade control section 40, a signal path 50 outputs an audio signal, input from a mixing apparatus (mixer or engine) that precedes the mixing apparatus in question (i.e., mixing apparatus which the cascade control section 40 belongs) in the cascade-connected apparatus group (hereinafter referred to as "preceding-cascade-stage mixing apparatus"), to a mixing apparatus that succeeds the mixing apparatus in question in the cascade-connected apparatus group (hereinafter referred to as "succeeding-cascade-stage mixing apparatus"). Further, a signal path 51 outputs or returns an audio signal, input from the succeeding-cascade-stage mixing apparatus, to the preceding-cascade-stage mixing apparatus. In this specification, each audio signal communicated between the mixers via the cascade connection (i.e., audio signals flowing over the signal path 50 or 51) will hereinafter be referred to as "cascade signal".

Adder section 41 adds together a cascade signal transmitted from the preceding-cascade-stage mixing apparatus and an audio signal output from the bus 33 of the mixing apparatus in question. More specifically, output signals from the corresponding buses of the cascaded mixing apparatus are added by the adder section 41. For example, audio signals output from the mixing bus of bus number B1 of the mixer 100, from the mixing bus of bus number B1 of the engine 200*a* and from the mixing bus of bus number B1 of the engine 200*b* are added together by the adder section 41. In this way, the corresponding buses 33 of the cascaded mixing apparatus are interconnected.

Switch section 42 is a switch for switching between ON and OFF of audio signal input from the mixing bus 33 of the mixing apparatus in question to the adder section 41. When the switch section 42 is in the OFF state, the output signal from the bus 33 is not added with the cascade signal of the signal path 50; namely, the bus 33 is not connected with the corresponding buses 33 of the other mixing apparatus cascade-connected with the mixing apparatus in question. Delay section 43 preceding the switch section 42 is provided for compensating for a delay resulting from the cascade connection when the cascade signal and output signal from the bus 33 are to be added by the adder section 41.

Switch section 44 is a switch that is turned on to interconnect the signal paths 50 and 51 if the mixing apparatus in question (i.e., mixing apparatus the section 44 belongs to) is at the last stage of the cascade connection (i.e., located at a predetermined position to function as a cascade master). Note that the functions of the adder section 41 and switch section 44 are conventionally known in the field of the ordinary cascade connection between mixing apparatus.

Selector section 45 selects, as the cascade signal to be output from the mixing apparatus in question to the preceding-cascade-stage mixing apparatus, either the cascade signal output from the bus 33 of the mixing apparatus in question or the cascade signal flowing over the signal path 51 (i.e., cascade signal output from the succeeding-cascade-stage mixing apparatus). Further, a selector section 46 selects, as the audio signal to be supplied to the plurality of output channels 34 or monitoring circuit 37, the audio signal output from the bus 33 of the mixing apparatus in question, the cascade signal flowing over the signal path 50 (cascade signal output from the preceding-cascade-stage mixing apparatus, i.e. audio signal with which the bus-output audio signal of the mixing apparatus in question has not yet been added) or the cascade signal flowing over the signal path 51 (i.e., cascade signal output from the succeeding-cascade-stage mixing apparatus).

Delay section 47 provided at a stage succeeding the selection section 46 is provided for compensating for a delay resulting from the cascade connection among the mixing apparatus when the audio signal is to be output to the audio signal output path.

With the cascade control sections 40 arranged in the aforementioned manner, destinations of the audio signals (including the cascade signals) of the buses 33 of the individual mixing apparatus can be controlled independently among the buses 33, by switching the settings of the switch and selector sections 42, 45 and 46. Namely, by switching the settings of any of the switch and selector sections 42, 45 and 46 depending on the operation mode ("normal mode" or "festival mode"), the instant embodiment can achieve a plurality of different signal path connections corresponding to the user-designated operation mode. Variations of the signal path connection corresponding to the user-designated operation mode will be described later with reference to FIGS. 4 and 5.

Figure 4:
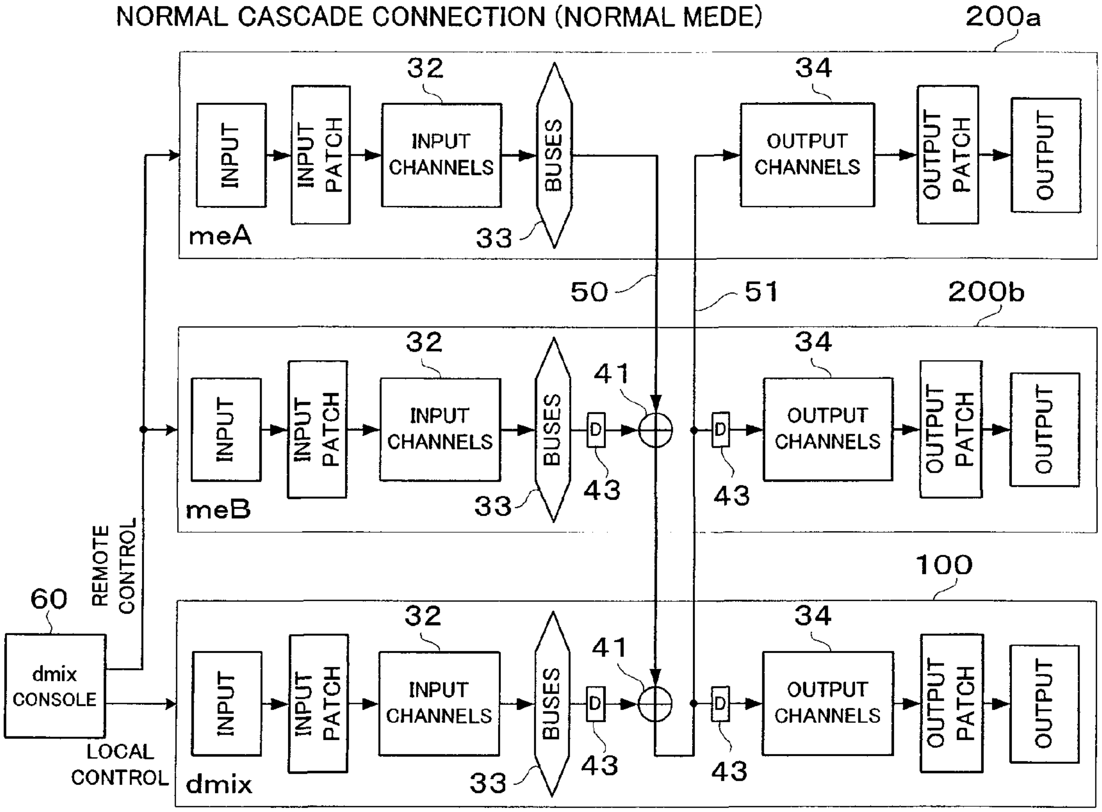
FIG. 4 is a block diagram showing an example audio signal processing construction to be used when the embodiment of the mixing system should operate in a "normal mode"

FIG. 4 is a block diagram showing an example audio signal processing construction when the instant embodiment of the mixing system should operate in the "normal mode". In the illustrated example of FIG. 4, the mixer ("dmix") 100 is connected with the engines ("meA" and "meB") 200*a* and 200*b* and located at a predetermined position to function as a cascade master, so that it receives output signals (cascade signals) from the respective buses 33 of the engines 200*a* and 200*b*. As illustrated in FIG. 4, output signals from the plurality of buses 33 of "meA" 200*a* are input, via the signal path 50, to "meB" 200*b* and added, via the adder sections 41 of "meB" 200*b*, with output signals of the corresponding buses 33 of "meB" 200*b*. Output signals from the adder sections 41 of "meB" 200*b* are input, via the signal path 50, to "dmix" 100 and added, via the adder sections 41 of "dmix" 100, with output signals of the corresponding buses 33 of "dmix" 100. By mixing the output signals from the corresponding buses 33 of the mixing apparatus (i.e., "dmix", "meA" and "meB") in the aforementioned manner, the corresponding buses are, in effect, interconnected. Ultimate outputs from the cascaded buses 33 can be supplied, via the signal path 51, to the output channels of the individual mixing apparatus. Thus, when the mixing system operates in the "normal mode", the buses 33 of the cascaded mixing apparatus are interconnected, so that the number of input channels handled by a single mixing apparatus can be increased. The foregoing functions in the "normal mode" are similar to the functions of the conventionally-known cascade connection.

As will be later detailed, when the instant embodiment of the mixing system operates in the "normal mode", the console section 60 of "dmix" 100 can be used to perform not only mixing control on each of the channels of the mixer 100 but also mixing control on each of the channels of the individual engines ("meA" and "meB"). In this specification, the mixing control on "dmix" 100 by the console section 60 of "dmix" 100 will hereinafter be referred to as "local control" or "local", while the mixing control on the engines ("meA" and "meB") by the console section 60 of "dmix" 100 will hereinafter be referred to as "remote control" or "remote".

Figure 5A:
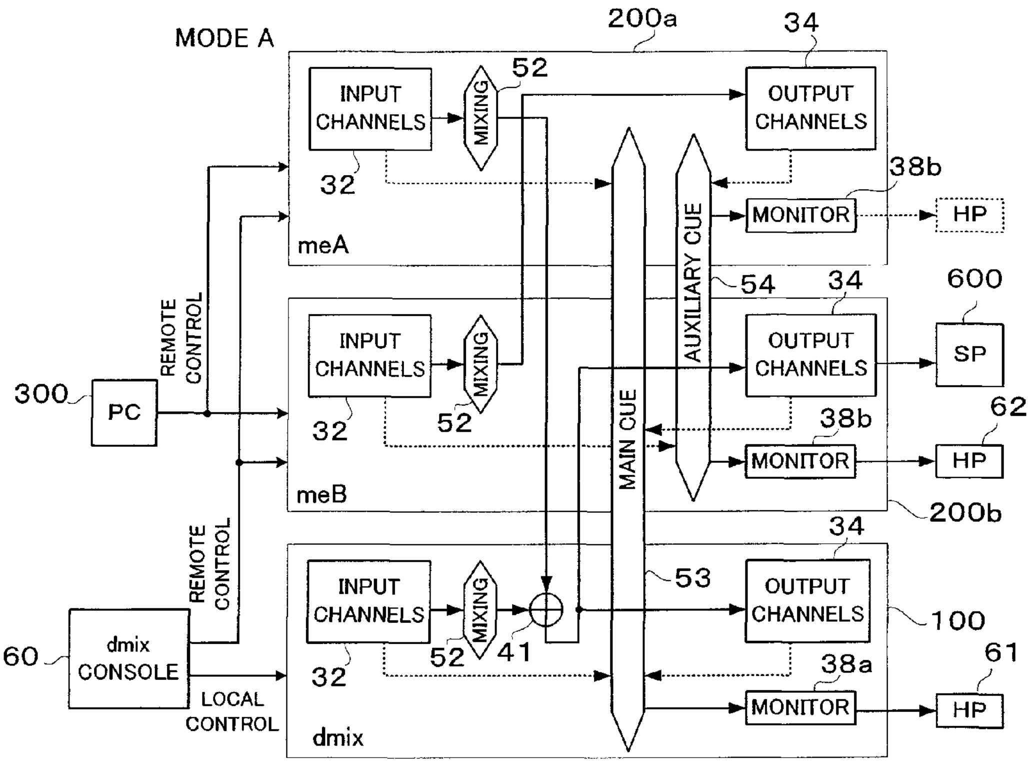
Figure 5B:
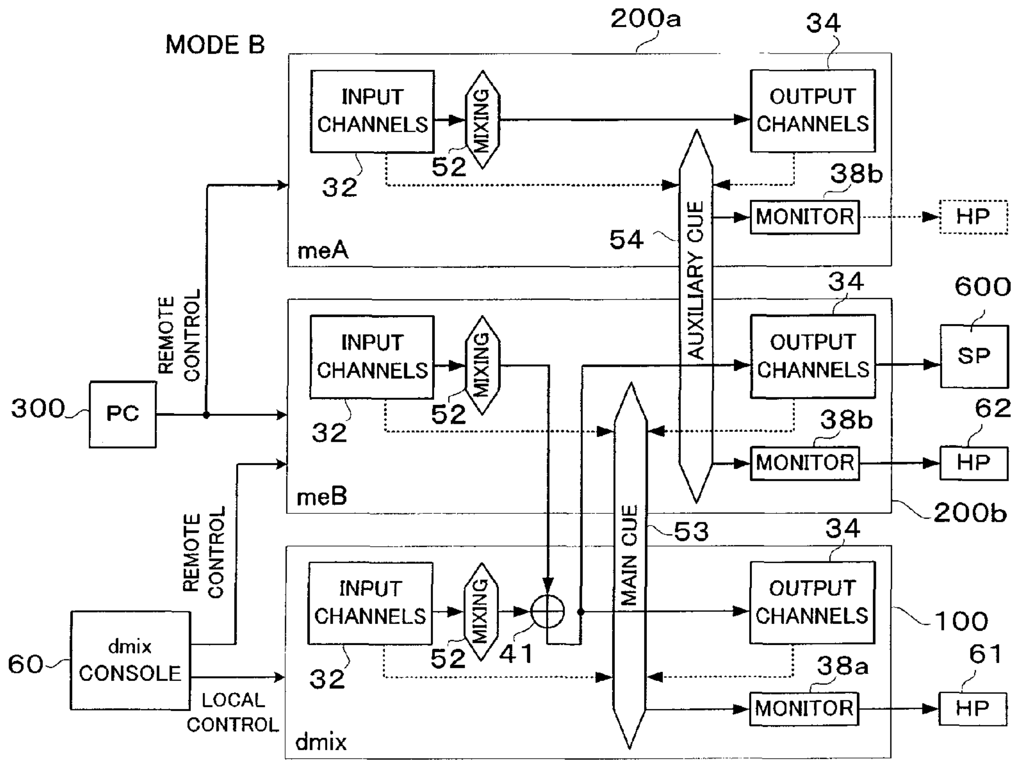

FIGS. 5A and 5B are block diagrams showing example constructions for audio signal processing when the instant embodiment of the mixing system should operate in the "festival mode". More specifically, FIG. 5A shows an example audio signal processing construction to be used in a sub-mode of the festival mode where audio signals for a performance to be exhibited on the stage are input to the engine ("meA") 200*a* (hereinafter "mode A" or "festival A mode"), while FIG. 5B shows an example audio signal processing construction in a sub-mode of the festival mode where audio signals for a performance to be exhibited on the stage are input to the engine 200*b* ("meB") (hereinafter "mode B" or "festival B mode"). In the embodiment of the mixing system, the sound system (speakers 600) is connected to "meB", as noted above; namely, the plurality of output channels 34 of "meB" 200*b* are used as the "main output path" of the mixing system.

First, the following lines describe the signal processing construction in "mode B" shown in FIG. 5B. In "mode B", audio signals for a performance to be exhibited on the stage are input to the plurality of input channels 32 of "meB" 200*b*. Thus, in this case, the audio signals input to "meB" 200*b* have to be supplied to the main output path, i.e. the plurality of output channels 34 of "meB" 200*b*. For this purpose, the mixing buses 52 of "meB" 200*b* and "dmix" 100 are interconnected, and the respective output channels 34 of "meB" 200*b* and "dmix" 100 are connected with the output of the interconnected mixing buses 52 of "meB" 200*b* and "dmix" 100, as shown in FIG. 5B. In this way, audio signals obtained by mixing output signals from the respective mixing buses 52 of "meB" 200*b* and "dmix" 100 (typically, only audio signals input to "meB" 200*b*) are sounded through the speakers 600.

Further, the main CUE buses 53 of "meB" 200*b* and "dmix" 100 are cascade-connected with each other, and the respective input channels 32 and output channels 34 of "meB" 200*b* and "dmix" 100 are connected to the interconnected main CUE buses 53 of "meB" 200*b* and "dmix" 100 as inputs to the buses 53. The monitoring output section 38 of "dmix" 100 is connected to the interconnected main CUE buses 53 as an output destination of the buses 53. The user can use a headphone set (HP) 61, connected to the monitoring output section 38*a* of "dmix" 100, to monitor audio signals output from the interconnected CUE buses 53 (i.e., main output audio signals).

Meanwhile, audio signals for a succeeding performance are input to the plurality of input channels 32 of "meA" 200*a*. Output signals from the individual mixing buses 52 of "meA" 200*a* are supplied to the output channels 34 of "meA" 200*a*. Auxiliary CUE buses 54 of "meA" 200*a* and "meB" 200*b* are cascade-connected with each other, and the input channels 32 and output channels 34 of "meA" 200*a* are connected to the interconnected auxiliary CUE buses 54 as inputs to the buses 54. Monitoring output sections 38*b* of "meA" 200*a* and "meB" 200*b* are connected to the interconnected auxiliary CUE buses 54 as output destinations of the buses 54. In the illustrated example, the user can use a headphone set (HP) 62, connected to the monitoring output section 38*b* of "meB" 200*b*, to monitor audio signals output from the interconnected auxiliary CUE buses 54 (i.e., auxiliary output audio signals).

Namely, the main feature of "mode B" is that, for the cascade control sections 40 corresponding to the mixing buses 52, cascade setting is performed to interconnect only "meB" 200*b* and "dmix" 100.

The following lines describe the signal processing construction in "mode A" shown in FIG. 5A. In "mode A", audio signals for a performance to be exhibited on the stage are input to the plurality of input channels 32 of "meA" 200*a*. Thus, in this case, the audio signals input to "meA" 200*a* have to be supplied to the main output path, i.e. the plurality of output channels 34 of "meB" 200*b*. For this purpose, the mixing buses 52 of "meA" 200*a* and "dmix" 100 are interconnected, and the respective output channels of "meB" 200*b* and "dmix" 100 are connected to the output of the interconnected mixing buses 52 as output destinations of the buses 52, as shown in FIG. 5A. In this way, audio signals obtained by mixing output signals from the respective mixing buses 52 of "meA" 200*a* and "dmix" 100 (typically, only audio signals input to "meA" 200*a*) are sounded through the speakers 600.

Further, the main CUE buses 53 of "meA" 200*a*, "meB" 200*b* and "dmix" 100 are cascade-connected with one another, and the respective input channels 32 of "meA" 200*a* and "dmix" 100 and output channels 34 of "meB" 200*b* and "dmix" 100 are connected to the interconnected main CUE buses 53 as inputs to the buses 53. The monitoring output section 38*a* of "dmix" 100 is connected to the interconnected main CUE buses 53 as an output destination of the buses 53.

The user can use the headphone set (HP) 61, connected to the monitoring output section 38*a* of "dmix" 100, to monitor audio signals output from the interconnected CUE buses 53 (i.e., main output audio signals).

Meanwhile, audio signals for a succeeding performance are input to the plurality of input channels 32 of "meB" 200*b*. Output signals from the individual mixing buses 52 of "meB" 200*b* are supplied to the output channels 34 of "meA" 200*a* through the cascade connection. The auxiliary CUE buses 54 of "meA" 200*a* and "meB" 200*b* are cascade-connected with each other, and the input channels 32 of "meB" 200*b* and output channels 34 of "meA" 200*a* are connected to the interconnected auxiliary CUE buses 54 as inputs to the buses 54. The monitoring output sections 38*b* of "meA" 200*a* and "meB" 200*b* are connected to the interconnected auxiliary CUE buses 54 as output destinations of the buses 54. In the illustrated example, the user can use the headphone set (HP) 62, connected to the monitoring output section 38*b* of "meB" 200*b*, to monitor audio signals output from the interconnected auxiliary CUE buses 54 (i.e., auxiliary output audio signals).

Namely, the main feature of "mode A" is that, for the cascade control sections 40 corresponding to the mixing buses 52, cascade setting is performed to interconnect "meA" 200*a* and "dmix" 100 so that outputs of interconnected "meA" 200*a* and "dmix" 100 are output from "meB" 200*b* and "dmix" 100. Namely, the switch sections 42 in "meA" 200*a* and "dmix" 100 are set to ON, while the switch section 42 in "meB" 200*b* is set to OFF. Further, cascade signals flowing over the signal path 51 are selected as output signals of the selector sections 46 of "meB" 200*b* and "dmix" 100, and the selector sections 45 of "meB" 200*b* are set to cascade-output output signals of the mixing buses 52 of the mixing apparatus in question to "meA" 200*a*.

In the "festival mode" of the instant embodiment of the mixing system of the invention, control can be performed on the channels, to which are supplied audio signals for a performance currently exhibited on the stage, in response to operation, by the user, on the console section 60, while control can be performed on the channels, to which are supplied audio signals for a succeeding performance, in response to operation, by the user, on the PC (auxiliary console section) 300. In "mode B" shown in FIG. 5B, the object of remote control based on operation, by the user, on the console section 60 of "dmix" 100 is the input channels 32 and output channels 34 of "meB" 200*b*, and the object of remote control based on operation, by the user, on the PC 300 is the input channels 32 and output channels 34 of "meA" 200*a*. Further, in "mode A" shown in FIG. 5A, the object of remote control based on operation, by the user, on the console section 60 of "dmix" 100 is the input channels 32 of "meA" 200*a* and output channels 34 of "meB" 200*b*, and the object of remote control based on operation, by the user, on the PC 300 is the input channels 32 of "meB" 200*b* and output channels 34 of "meA" 200*a*.

The mixing operation in the festival mode is carried out in the following manner. While a performance pertaining to one of the two performance platforms (e.g., "platformB" 400*b*) is being exhibited or executed on the stage, the mixing system is set in "mode B", so that characteristics of audio signals for the currently-executed performance are controlled by the mixing processing on the individual input channels 32 and output channels 34 of "meB" 200*b* being controlled via the console section 60 of "dmix" 100. Further, in response to CUE instructing operation of a particular channel performed via the console section 60 of "dmix" 100, signals of the particular channel, designated from among the input channels 32 and output channels 34 of "meB" 200*b*, can be monitored through the monitoring output section 38*a* of "dmix" 100. On the other hand, characteristics of audio signals for a succeeding performance pertaining to the other performance platform (e.g., "platformA") being kept standby on one of the wings of the stage are controlled by the mixing processing on the individual input channels 32 and output channels 34 of "meB" 200*b* being controlled via the PC (auxiliary operation section) 300. Further, in response to CUE instructing operation of a particular channel designated on the PC 300, signals of the particular channel, designated from among the input channels 32 and output channels 34 of "meA" 200*a*, can be monitored through the monitoring output section 38*b* of "meB" 200*b*.

While a performance pertaining to the other performance platform (e.g., "platformA" 400*a*) is being exhibited on the stage, the mixing system is switched to "mode A", so that characteristics of audio signals for the currently-executed performance are controlled by the mixing processing on the individual input channels 32 and output channels 34 of "meA" 200*a* being controlled via the console section 60 of "dmix" 100. Further, in response to CUE instructing operation of a particular channel designated on the console section 60 of "dmix" 100, signals of the particular channel, designated from among the input channels 32 and output channels 34 of "meB" 200*b*, can be monitored through the monitoring output section 38*a* of "dmix" 100. On the other hand, characteristics of audio signals for a succeeding performance pertaining to the performance platform ("platformB") being kept standby on the other wing of the stage are controlled by the mixing processing on the individual input channels 32 and output channels 34 of "meB" 200*b* being controlled via the PC (auxiliary operation section) 300. Further, in response to CUE instructing operation of a particular channel performed via the PC 300, signals of the particular channel, designated from among the input channels 32 and output channels 34 of "meB" 200*b*, can be monitored through the monitoring output section 38*b* of "meB" 200*b*.

By switching between "mode A" and "mode B", the mixing operation for a performance pertaining to "platformA" and the mixing operation for a performance pertaining to "platformB" can be remote-controlled alternately by the control section 60 of the single mixer ("dmix") 100. As a result, in an event, such as a festival, the instant embodiment of the mixing system permits efficient mixing operation in a case where two sets of performance platforms are provided and used alternately (i.e., where, while a performance of "platformA" is being executed, preparations for a succeeding performance are made).

FIG. 6 is a schematic outer appearance view showing principal sections of the console section of the mixer ("dmix") 100. On the console section 60 of the mixer 100, there are provided the display 7 (see FIG. 1), a plurality of monaural channel strips 70, stereo (ST) output channel strips 71, mode change switches 72, 73 and 74, object-of-control change switches 75, 76 and 77, layer change switches 78, 79 and 80, etc.

The monaural channel strips 70 are modules for performing mixing operation on the monaural channels, such as the input channels 32 or output channels 34, and the stereo output channel strips 71 are modules for performing mixing operation on stereo output channels included in the output channels 34. The console section 60 of "dmix" 100 includes, for example, 24 monaural channel strips 70, and two (i.e., left and right) stereo output channels. Each of the monaural channel strips 70 and stereo output channel strips 71 includes: the electric fader 9 (see FIG. 1) for adjusting a sound volume, a CUE switch 81 for giving a CUE (CUE-ON) instruction to send an audio signal of the channel; a selection switch 82 for developing in detail a parameter of the channel, an ON/OFF (mute) switch 83 of the channel; and a knob operator 84 for adjusting an allocated parameter (e.g., send level to a mixing bus, gain, panning, or the like). For each of the channel strips 70 and 71, the user can make various parameter settings related to mixing processing on the channel assigned to the channel strip. Channel assignment to the channel strips 70 and 71 will be later described in detail.

Each of the mode change switches 72-74, object-of-control change switches 75-77 and layer change switches 78-80 has a light emitting element, such as an LED, incorporated therein. By illuminating each switch for which a corresponding function or parameter is ON, the instant embodiment can display a currently-selected operation mode, object of control or layer. In the illustrated example of FIG. 6, it is assumed that "festival mode A", "Remo1" and "Layer 1" are currently selected, and each switch being illuminated is indicated in halftone. Further, each of the channel strips 70 and 71 and switches 81, 82 and 83 has a light emitting element, such as an LED, incorporated therein; each switch for which a corresponding function or parameter is ON is illuminated. Further, a plurality of light emitting elements, such as LEDs, are disposed around each of the knob operators 84, so that the current setting of the knob operator 84 can be displayed by illumination of the light emitting elements.

The console section 60 of "dmix" 100 includes a headphone terminal 85, and a sound-volume adjusting operator member 86 for the headphone terminal 85. The headphone terminal 85 corresponds to the operator's monitor 11 of FIG. 1 or monitoring output section 38 of FIG. 3. Further, the user can call any of various display screens to the display 7 to set any of various parameters using GUI components on the called display screen. The various display screens include a display screen of the input patch or output patch, screen for controlling principal parameters of a plurality of channel strip images, screen for developing in detail parameters of a particular channel to set detailed parameters.

The console section 60 of "dmix" 100*a* also includes, as a module for controlling a "scene store/recall" function, a scene number display section 87, a number increment (UP) switch 88 and decrement (DOWN) switch 89, a store switch 90 for instructing storage of a scene, and a recall switch 91 for instructing recall of a scene.

The mode change switches 72-74 are each operable to change the mode of the mixing processing, which consist of the switch 72 for selecting "mode A" of the festival mode (i.e., "festival "A" mode), switch 73 for selecting "mode B" of the festival mode (i.e., "festival "B" mode) and switch 74 for selecting the normal mode. With these mode change switches 72-74, the user can select a suitable operation mode corresponding to a desired form of usage of the mixing system. When the number of input channels of the mixer or engine is to be increased through the normal cascade connection, the normal mode is selected (i.e., the "normal" switch 74 is turned on and illuminated). Further, when the mixing system is used in the situation shown in FIG. 2 (in a music festival or the like), the festival mode is selected (i.e., "A" or "B" switch 72 or 73 is turned on and illuminated). In the festival mode, switching can be made between "mode A" and "mode B" in accordance with the mixing apparatus to which audio signals of a performance to be exhibited on the stage are input ("meA" or "meB").

The object-of-control change switches 75-77 are each provided for changing the object of control to be controlled via the console section 60 of the mixer 100. When the "Local" switch 75 has been operated (so that "Local" is illuminated), local control is performed on the stored contents (for controlling the DSP array 4) of the current memory of the mixer 100 in response to operation performed via the console section 60. Further, when the "Remo1" switch 76 or "Remo2" switch 77 has been operated (so that "Remo1" or "Remo2" is illuminated), the stored contents (for controlling the DSP array 16) of the current memory of another mixing apparatus (engine 200*a* or 200*b* of FIG. 2), connected to the mixer 100, is controlled in response to operation performed via the console section 60.

The layer change switches 78-80 are each provided for changing the channels to be assigned to the 24 monaural channel strips 70. When the "master1" switch 78 has been operated (so that "master1" is illuminated), a layer of 24 monaural output channels of channel numbers 1-24 (corresponding to the plurality of output channels 34 of FIG. 3) of any one of the mixing apparatus is assigned to the channel strips 70. Further, when the "layer1" switch 79 has been operated (so that "layer1" is illuminated), a layer of 24 input channels of channel numbers 1-24 (corresponding to the plurality of input channels 32 of FIG. 3) of any one of the mixing apparatus is assigned to the channel strips 70. Furthermore, when the "layer2" switch 80 has been operated (so that "layer2" is illuminated), a layer of 24 input channels of channel numbers 25-48 (corresponding to the plurality of input channels 32 of FIG. 3) of any one of the mixing apparatus is assigned to the channel strips 70.

Thus, with "dmix" 100 in the instant embodiment, a particular object of control by the console section 60 (including the monaural channel strips 70 and ST output channel strips 71) can be designated by a combination of settings of the mode change switches 72-74, object-of-control switches 75-77 and layer change switches 78-80.

The following lines describe a specific example manner in which channels to be controlled via the monaural channel strips 70 are assigned to the channel strips 70. It is assumed here that, when the mixing system is in the normal mode, the mixer ("dmix") 100 becomes the object of control in response to operation of the "Local" switch 75, "meB" 200*b* becomes the object of control in response to operation of the "Remo1" switch 76, and "meA" becomes the object of control in response to operation of the "Remo2" switch 77. Then, for the object of control selected via the object-of-control change switches 75-77, a group of channels belonging to a layer selected via the layer change switches 78-80 are assigned to the monaural channel strips 70. Further, for the object of control to be controlled by any one of the ST output strips 71, the assignment depends on the selection by any one of the object-of-control change switches 75-77. In an alternative, "meA" 200*a* and "meB" 200*b* may be assigned to the "Remo1" switch 76 and "Remo2" switch 77, respectively, and correspondency between the "Remo1" switch 76 and "Remo2" switch 77 and the engines may be set by the user.

Further, when the mixing system is in the normal mode (with the "normal" switch 74 illuminated), the DSP array 16 of "meB" becomes the object of control in response to operation of the "Remo1" switch 76, and the "Remo1" switch 76 is illuminated. The DSP array 16 of "meA" becomes the object of control in response to operation of the "Remo2" switch 77, and the "Remo2" switch 77 is illuminated. Further, the DSP array 4 of the mixer 100 becomes the object of control in response to operation of the "Local" switch 75, and the "Local" switch 75 is illuminated.

In the festival mode, the DSP array 4 of the mixer 100 performs local control on the mixer 100 in response to selection of the "Local" switch 75 in each of "mode A" and "mode B", so that the channels of "dmix" 100, belonging to a layer selected through operation of any one of the layer change switches 78-80, are assigned to the monaural channel strips 70.

Further, in the festival mode, the object of control by the monaural channel strips 70 is determined, in correspondence with "mode A" or "mode B", in response to selection of the "Remo1" switch 76 as shown in FIG. 7B. Namely, in "mode A", the monaural output channels "CH1"-"CH24" of "meB" 200*b* are allocated to "Master1", the monaural output channels "CH1"-"CH24" of "meA" 200*a* are allocated to "Layer1", and the monaural output channels "CH25"-"CH48" of "meA" 200*a* are allocated to "Layer2". Namely, in "mode A" of the festival mode, the input channels 32 of "meA" 200*a* are allocated to "Layer1" and "Layer2" while the monaural output channels 34 of "meB" 200*b* are allocated to "Master1", and thus, in the illustrated example of FIG. 5B, the remote control signal line of the console section 60 of "dmix" 100 is connected to both of "meA" 200*a* and "meB" 200*b* as indicated by a double-head arrow. Further, in "mode A" (with the "A" switch 72 illuminated), once the "Remo1" switch 76 or "Remo2" switch 77 is operated with "master1" selected (i.e., with the "master1" switch 78 illuminated), the DSP array 16 of "meB" 200*b* becomes the object of control, so that the "Remo1" switch 76 corresponding to the object of control is illuminated. Furthermore, in "mode A", once the "Remo1" switch 76 or "Remo2" switch 77 is operated with "Layer1" or "Layer2" selected (i.e., with the "Layer1" or "Layer2" switch 79 or 80 illuminated), the DSP array 16 of "meA" 200*a* becomes the object of control, so that the "Remo2" switch 77 corresponding to the object of control is illuminated. Once the "Local" switch 75 is operated, the DSP array 4 of the mixer 100 becomes the object of control irrespective of the layer-selected state, so that the "Local" switch 75 is illuminated. Namely, in mode A" of the festival mode, the illumination is automatically switched between the "Remo1" switch 76 and the "Remo2" switch 77 depending on whether the object of control is "meB" 200*b* or "meA" 200*a* in response to a currently-selected layer.

In "mode B" of the festival mode, on the other hand, the monaural output channels "CH1"-"CH24" of "meB" 200*b* are allocated to "Master1". The input channels "CH1"-"CH24" of "meB" 200*b* are allocated to "Layer1", and the input channels "CH25"-"CH48" of "meB" 200*b* are allocated to "Layer2". Namely, in "mode B", the input channels 32 of "meB" 200*b* are allocated to "Layer1" and "Layer2" while the output channels of "meB" 200*b* are allocated to "Master1", and thus, in the illustrated example of FIG. 5B, the remote control signal line of the console section 60 of "dmix" 100 is connected to "meB" 200*b* as indicated by a single-head arrow. Further, in "mode B" (with the "B" switch 73 illuminated), once the "Remo1" switch 76 or "Remo2" switch 77 is operated, the DSP array 16 of "meB" 200*b* becomes the object of control, so that the "Remo1" switch 76 corresponding to the object of control is illuminated. Furthermore, in "mode B", once the "Local" switch 75 is operated, the DSP array 4 of the mixer 100 becomes the object of control irrespective of the layer-selected state, so that the "Local" switch 75 is illuminated. Namely, in mode B" of the festival mode, "meB" 200*b* becomes the object of control irrespective of which of the "Remo1" switch 76 and "Remo2" switch 77 is operated.

In the aforementioned manner, the instant embodiment allows the user to confirm, through the illumination states of the switches 75-77, of which mixing apparatus the DSP array is currently the object of control, although the object of control by the monaural channel strips 70 may switch among the mixing apparatus in accordance with selection of an operation mode and layer.

Further, in the festival mode, the ST output channels of "dmix" 100 are assigned to the two ST output channel strips 71 in response to selection of "Local" 75, as shown in FIG. 7C. Furthermore, in each of "mode A" and "mode B", the ST output channels of "meB" 200*b*, used as the main outputs, are assigned to the two ST output channel strips 71.

Furthermore, when the festival mode is selected, the object of control by the application program stored in the PC 300, connected to "meA" 200*a* or "meB" 200*b* (see FIG. 5A and FIG. 5B), also switches in response to mode selection between "mode A" and "mode B". Namely, in "mode A", the object of control by the PC 300 is the input channels CH1-CH48 of "meB" 200*b* and the monaural output channels CH1-CH24 and ST output channels of "meA" 200*a*, while, in "mode B", the object of control by the PC 300 is the input channels CH1-CH48 of "meA" 200*a* and the monaural output channels CH1-CH24 and ST output channels of "meB" 200*b* (see FIG. 7D).

Figure 8:
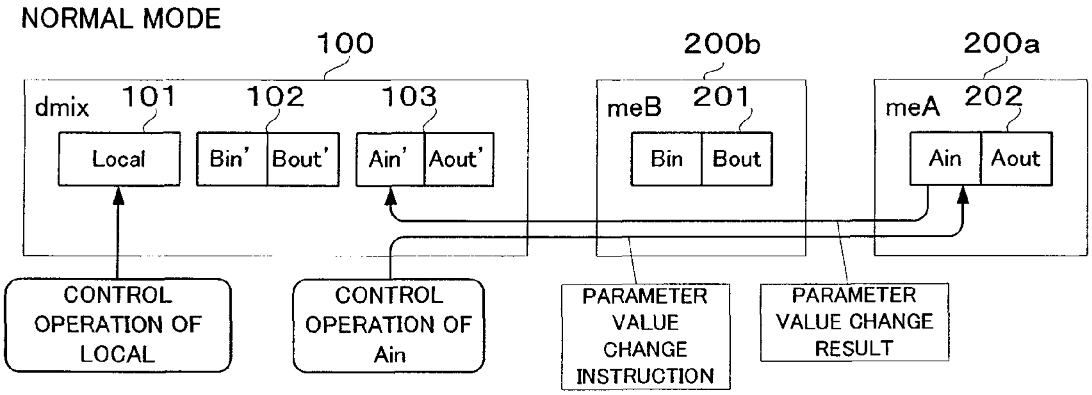
FIG. 8 is a diagram explanatory of constructions of current memories provided in individual mixing apparatus included in the embodiment of the mixing system and parameter editing performed in current memories in the "normal mode"

FIG. 8 is a diagram explanatory of constructions of the current memories provided in the mixer 100 and engines 200*a* and 200*b*, as well as parameter editing performed in the current memories in the normal mode. As shown in FIG. 8, the RAM 3 of the mixer ("dmix") 100 (see FIG. 1) includes: a local current memory ("Local") 101 for storing the current settings of various parameters for the mixing processing in "dmix" 100; a remote current memory ("Bin'" and "Bout'") 102 for storing the current settings of various parameters for remote-controlling "meB" cascade-connected with "dmix" 100; and a remote current memory ("Ain'" and "Aout'") 103 for storing the current settings of various parameters for remote-controlling "meA" cascade-connected with "dmix" 100. The parameters stored in the local current memory 101 are used both in control of the mixing processing (control of the DSP array 4) of "dmix" 100 and in display control performed when the current values or settings of the mixing processing parameters of "dmix" 100 have been read out to the console section 60 of "dmix" 100. Further, the parameters stored in the remote current memories 102 and 103 are used in remote control of the corresponding engines, i.e. in display control performed when the current values or settings of the mixing processing parameters of the corresponding engines have been read out to the console section 60 of "dmix" 100.

Further, a local current memory ("Bin" and "Bout") 201 for storing the current settings of various parameters for mixing control of "meB" 200*b* is provided in the RAM 15 of the engine ("meB") 200*b* (see FIG. 1), and a local current memory ("Ain" and "Aout") 202 for storing the current settings of various parameters for mixing control of "meA" 200*a* is provided in the RAM 15 of the engine ("meA") 200*a*. The parameters stored in each of the local current memories 201 and 202 are used both in control of the mixing processing (control of the DSP array 16) of the corresponding engine.

For each of the remote current memories 102 and 103 and local current memories 201 and 202 shown in FIG. 8, current memory sections (Ain, Bin, Ain', Bin') for storing parameters related to the input channels and current memory sections (Aout, Bout, Aout', Bout') for storing parameters related to the output channels are depicted separately. This is for the purpose of clarifying that the input channels and output channels of "meA" 200*a* and "meB" 200*b* are separately selected and remote-controlled by the console section 60.

Figure 9:
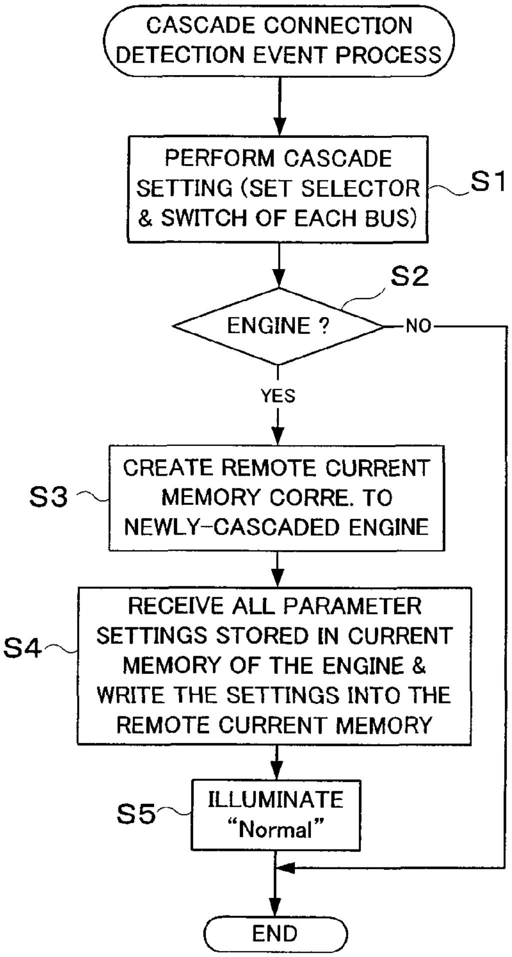
FIG. 9 is a flow chart showing an example operational sequence of a cascade-connection detection event process performed by the mixer in the embodiment when a new cascade-connection detection event has been detected.

FIG. 9 is a flow chart showing an example operational sequence of a cascade-connection detection event process performed by the mixer ("dmix") 100 when a new cascade-connection detection event has been detected. Let it be assumed that "dmix" 100 constantly checks states of connection, to its cascade I/O 6 (see FIG. 1), of other mixing apparatus. Upon detection of new cascade connection, "dmix" 100 performs, for each of the buses (i.e., buses 33 in FIG. 3), cascade setting of the cascade control section 40, i.e. setting of the switch section 43 and selector sections 45 and 46, at step S1. In this way, a signal path is established for performing communication of audio signals with the mixing apparatus newly cascade connected with "dmix" 100. Let it be assumed here that the mixing system operates in the normal mode at a cascade-connection initialization stage. Namely, at step S1, the cascade setting in the normal mode is performed.

At nest step S2, a determination is made as to whether the mixing apparatus newly cascaded with "dmix" 100 is a mixer engine. If a mixing apparatus other than a mixer engine (i.e. mixer having the console section) has been cascaded as determined at step S2, there will be achieved a better operability by the newly-cascaded mixer being controlled via its own console section rather than being remote-controlled via the console section of the mixer ("dmix") 100 through the cascade connection. Thus, in the instant embodiment, operations at and after step S3 are carried out only when a mixer engine has been cascaded with the mixer 100 (YES determination at step S2), to thereby allow the engine to be remote-controlled by the mixer 100. If a mixing apparatus other than a mixer engine has been cascaded with the mixer 100 (NO determination at step S2), the cascade-connection detection event process is brought to an end without the newly-cascaded mixer being handled as the object of remote control. However, a mixing apparatus other than a mixer engine may of course be handled as the object of remote control, in which case the determination operation at step S2 may be dispensed with. In an alternative, the user may make a setting as to whether or not a mixing apparatus other than a mixer engine should be handled as the object of remote control.

At step S3, a remote current memory for, or corresponding to, the newly cascaded engine is created in the RAM 3 of "dmix" 100, e.g. by securing in the RAM 3 a storage region to be used as such a remote current memory. In this manner, the remote current memory 102 of "meB" 200*b* and remote current memory 103 of "meA" 200*a* can be created in "dmix" 100. At step S4, data of all parameter settings stored in the current memory of the newly-cascaded engine are received from the newly-cascaded engine, and the received data are written into the remote current memory created in the mixer 100 for the newly-cascaded engine. In this manner, the stored contents of the remote current memory 102 or 103 for the newly-cascaded engine in the mixer 100 can be made to agree with the stored contents of the local current memory 201 or 202 of the newly-cascaded engine, so that the remote control, by "dmix" 100, of the newly-cascaded engine becomes effective. After that, as long as the remote control is performed, any change made to the local current memory 201 or 202 is transmitted to the remote current memory 102 or 103 so that the same change can be made to the stored contents of the remote current memory 102 or 103; thus, control can be performed such that the stored contents of the two (i.e., local and remote) current memories can constantly agree with each other.

At step S5, the "normal mode" selection switch 74 is illuminated; this is because the normal mode is set as an initial mode in the instant embodiment as noted earlier. Let it also be assumed here that "dmix" 100 transmits a current setting instruction to the cascaded engine to cause the cascade control section 40 of each of the buses of the engine to perform cascade setting of the normal mode.

Figure 10:
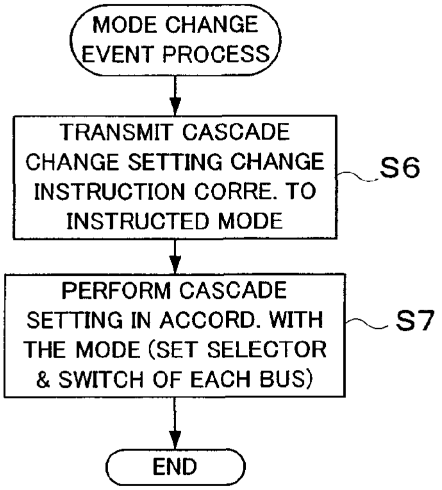
FIG. 10 is a flow chart showing an example operational sequence of a mode change event process performed by the mixer in the embodiment.

FIG. 10 is a flow chart showing an example operational sequence of a mode change process performed by the mixer ("dmix") 100 when a mode change has been instructed by operation of any one of the mode change switches 72-74. Once a mode change is instructed by operation of any one of the mode change switches 72-74, the mixer 100 transmits a cascade setting change instruction, corresponding to the instructed mode, to all engines cascade-connected with the mixer 100, at step S6. Then, at step S7, cascade setting is performed on the cascade control section 40 per bus 33 of "dmix" 100 in accordance with the instructed mode. In each of the cascade-connected engines too, cascade setting is performed on the cascade control section 40 per bus of the engine on the basis of the received cascade setting change instruction. In this manner, a signal path is established in the mixing system in accordance with the user-selected mode (see FIGS. 4 and 5A and 5B).

Figure 11:
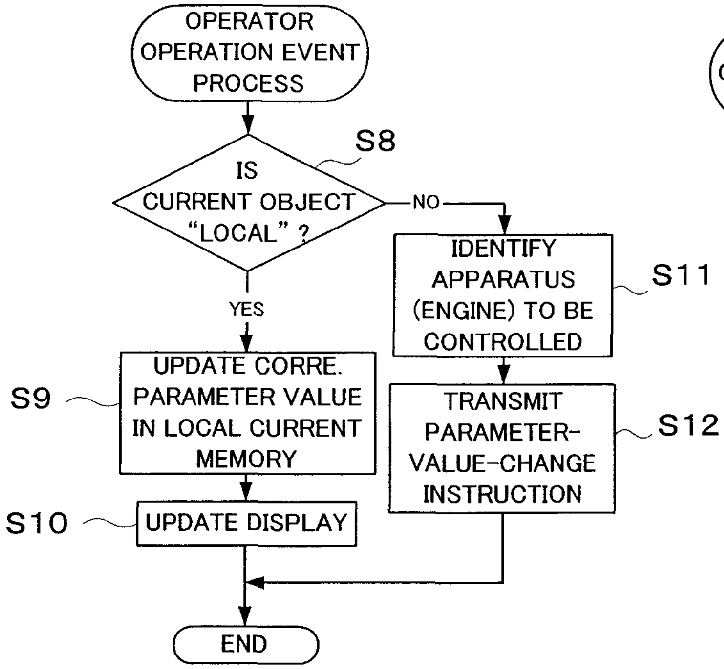
FIG. 11 is a flow chart showing an example operational sequence of an operator operation event process performed by the mixer in the embodiment.

FIG. 11 is a flow chart showing an example operational sequence of an operator operation event process performed by the mixer ("dmix") 100 in response to generation of an operation event of any one of the operator members provided on the console section 60 of "dmix" 100. Here, the "operation event" means operation of any one of the operator members for changing the value of a parameter related to the mixing processing, such as operation of any one of the electric faders 9 and knob operators 84 or parameter setting operation via any one of the GUI components of the display 7. Upon detection of an operation event of any one of the operator members on the console section 60 of "dmix" 100, "dmix" 100 determines what is the current object of control (by checking selection states of the object-of-control change switches 75-77) at step S8 of FIG. 11.

If the current object of control is "Local" (YES determination at step S8), and once mixing operation (control operation of "Local" in FIG. 8) is performed on the console section 60, the value of a parameter, corresponding to the mixing operation, of the parameters currently stored in the local current memory 101 is updated at step S9, so that the signal processing by the DSP array 4 will be controlled on the basis of the updated stored contents of the local current memory 101. Further, at step S10, the corresponding parameter value displayed on the console section is updated on the basis of the parameter value updated at step S9 above. The parameter display updating at step S10 includes illumination control of the illuminating elements disposed around the corresponding knob operator member 84, updating of the corresponding parameter indication (e.g., visual indication of a value indicated within a numerical value box, operating position of the corresponding GUI component and the like) on the screen of the display 7, electric control of the operating position of the corresponding fader operator, etc.

If the current object of control is "Remote" (NO determination at step S8), the engine to be controlled is identified at step S11. Then, at step S12, a remote control signal instructing a value change of the parameter corresponding to the mixing operation on the console section 60 (i.e., parameter-value-change instructing signal or parameter-value-change instruction) is transmitted to the identified cascade-destination engine via the cascade connection. Namely, the parameter-value-change instructing signal includes information that designates the cascade-destination engine to be controlled, so that, on the basis of the information designating the cascade-destination engine, the engine in question can receive, via the cascade connection, the parameter-value-change instructing signal transmitted thereto.

In FIG. 8, there is shown an example of the parameter editing process based on remote control in the normal mode, where any of parameter settings related to the input channels of "meA" has been changed via the console section of "dmix" 100. More specifically, FIG. 8 shows the example where, in the normal mode, "Remo2" has been selected as the object of control (i.e., the "Remo2" switch 77 has been illuminated) and "layer1" or "Layer2" has been selected as the layer (i.e., "layer1" switch 79 o "layer2" switch 80 has been selected). Once any one of the operator members of the monaural channel strips 70 is operated on the console section 60 of "dmix" 100 in this state, a parameter setting related to the input channel of "meA" 200*a* is changed (i.e., control operation of "Ain"), and then, a parameter-value-change instructing signal corresponding to the control operation of "Ain" is transmitted to "meA" 200*a* via the cascade connection. On the basis of the parameter-value-change instructing signal received, "meA" 200*a* updates the value of the corresponding parameter in the local current memory 202 (i.e., one of the parameters contained in the "Ain" current memory section). Such updating of the local current memory 202 is reflected in the signal processing by the DSP array 16 of the engine ("meA") 200*a*. After completion of the updating of the local current memory 202, "meA" 200*a* transmits the updated value of the parameter, i.e. "parameter value change result", to "dmix" 100.

Figure 12:
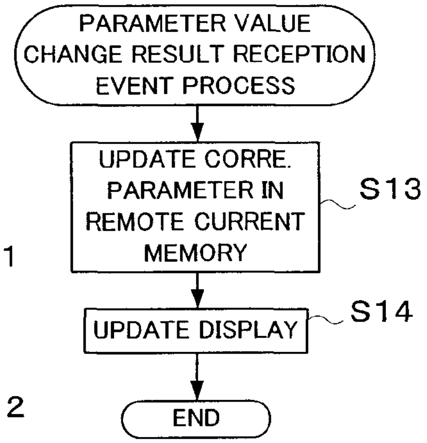
FIG. 12 is a flow chart showing an example operational sequence of a parameter value change result reception event process performed by the mixer in the embodiment.

FIG. 12 is a flow chart showing an example operational sequence of a parameter value change result reception event process performed by the mixer ("dmix") 100 when the "parameter value change result" has been received from the engine cascaded with the mixer 100. On the basis of the received parameter value change result, dmix" 100 updates the value of the corresponding parameter in the remote current memory 103 of "meA" 200*b* (i.e., one of the parameters contained in the "Ain'" current memory section), at step S13. Then, at step S14, a visual indication of the parameter value is updated on the console section 60 of "dmix" 100. Similarly to the one explained above in relation to step S10, the parameter value indication updating at step S14 includes illumination control of the illuminating elements disposed around the corresponding knob operator member 84, updating of the corresponding parameter indication on the screen of the display 7 (e.g., updating of a visual indication of the value indicated within the corresponding numerical value box, operating position of the corresponding operator member image, GUI component and the like) on the screen of the display 7, electric control of the operating position of the corresponding fader operator, etc. Through the operations of FIG. 12, the "parameter value change result" in the engine cascaded with "dmix" 100 can be reflected in the console section of "dmix" 100.

Similarly, in a case where an engine ("meA" 200*a* or "meB" 200*b*) has been controlled via the PC 300, the stored contents of the local current memory 201 or 202 are updated, so that a "parameter value change result" based on the updating is transmitted to "dmix" 100. Thus, "dmix" 100 performs the aforementioned process of FIG. 12 on the basis of the "parameter value change result" received from the engine 200*a* or 200*b*. In this case, however, depending on the local/remote setting or layer setting in the console section 60, i.e. if the engine in question or layer thereof is not currently selected on the console section 60, updating of a visual indication, on the console section 60, corresponding to the parameter value change result (step S14 of FIG. 12) is not effected at this time, although the corresponding value in the remote current memory is updated (step S13 of FIG. 12).

Figure 13A:
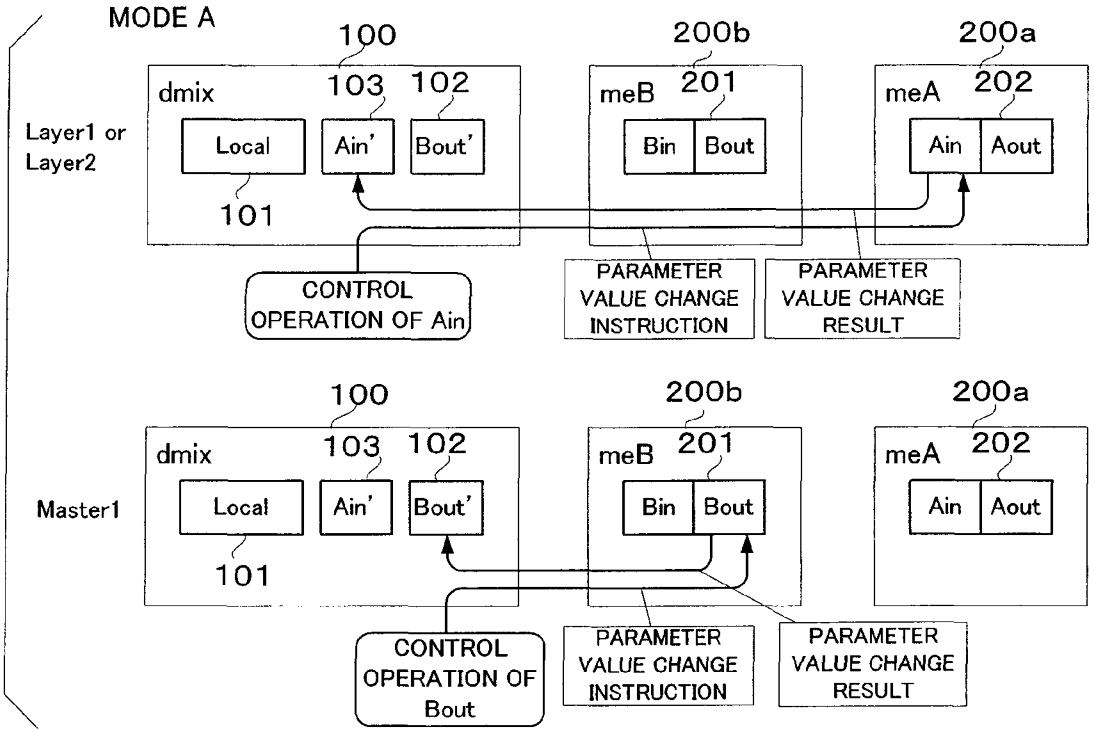
Figure 13B:
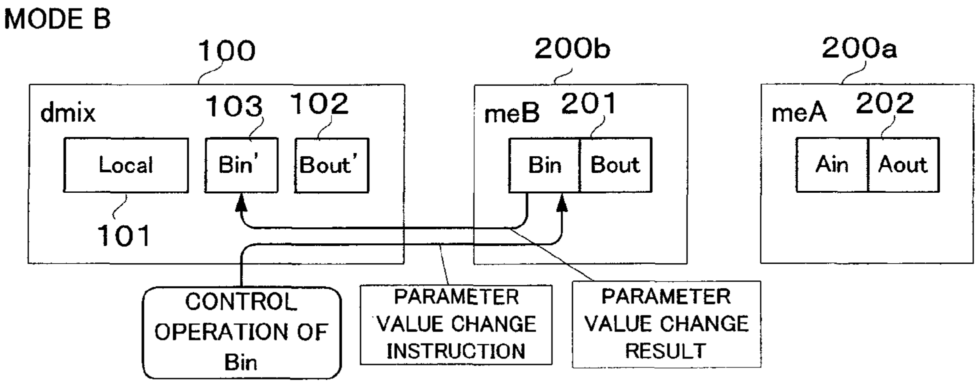

Next, with reference to FIGS. 13A and 13B, a description will be given about examples of the parameter editing process based on remote control in the festival mode. FIG. 13A shows an example of the parameter editing process based on remote control in "mode A" of the festival mode, while FIG. 13B shows another example of the parameter editing process based on remote control in "mode B" of the festival mode. Whereas the parameter editing process based on remote control in the festival mode is basically similar to the parameter editing process in the normal mode explained above in relation to FIGS. 8 and 12, the parameter editing process in the festival mode is characterized by its way of setting the object of remote control.

In "mode A", as shown in FIG. 13A, once any one of the operator members of the monaural channel strips 70 on the console section 60 of "dmix" 100 is operated when "layer1" or "layer2" is selected as the object of control by the console section 60 of "dmix" 100 (i.e., the "layer1" or "layer2" switch 79 or 80 and "Remo2" switch 77 are illuminated), a parameter setting related to the input channel of "meA" 200*a* is changed (control operation of "Ain"). Then, a signal instructing a parameter value change corresponding to the "Ain" control operation is transmitted to "meA" 200*a* via the cascade connection (step S12 of FIG. 11). On the basis of the parameter-value-change instructing signal received, "meA" 200*a* updates the value of the corresponding parameter in the local current memory 202 (i.e., one of the parameters contained in the "Ain" current memory section). Such updating of the local current memory 202 is reflected in the signal processing by the DSP array 16 of "meA" 200*a*. "meA" 200*a* transmits the updated value of the parameter, i.e. "parameter value change result", to "dmix" 100. On the basis of the parameter value change result received, dmix" 100 updates the value of the corresponding parameter in the remote current memory ("Ain'") 103 of "meA" 200*a* (step S13 of FIG. 12). Then, on the basis of the updating, a visual indication of the parameter value is updated on the console section 60 of "dmix" 100 (step S14 of FIG. 12).

Further, once any one of the operator members of the monaural channel strips 70 on the console section 60 of "dmix" 100 is operated when "master1" is selected as the object of control by the console section 60 of "dmix" 100 (i.e., the "master" switch 78 and "Remo1" switch 76 are illuminated) in the example of FIG. 13A, a parameter setting related to the output channel of "meB" 200*b* is changed (control operation of "Bout"). Then, a signal instructing a parameter value change corresponding to the "Bout" control operation is transmitted to "meB" 200*b* via the cascade connection. On the basis of the parameter-value-change instructing signal received, "meB" 200*b* updates the value of the corresponding parameter in the local current memory 201 (i.e., one of the parameters contained in the "Bout" current memory section). Such updating of the local current memory 201 is reflected in the signal processing by the DSP array 16 of "meB" 200*b*. "meB" 200*b* transmits the updated value of the parameter, i.e. "parameter value change result", to "dmix" 100. On the basis of the parameter value change result received, dmix" 100 updates the value of the corresponding parameter in the remote current memory ("Bout'") 102 of "meB" 200*b*. Also, on the basis of the updating, a visual indication of the parameter value is updated on the console section 60 of "dmix" 100.

In "mode B", as shown in FIG. 13B, once any one of the operator members of the monaural channel strips 70 on the console section of "dmix" 100 is operated when "layer1" or "layer2" is selected as the object of control by the console section 60 of "dmix" 100 (i.e., the "layer1" or "layer2" switch 79 or 80 and "Remo1" switch 76 are illuminated), a parameter setting related to the output channel of "meB" 200*b* is changed (control operation of "Bin"). Then, a signal instructing a parameter value change corresponding to the "Bin" control operation is transmitted to "meB" 200*b* via the cascade connection. On the basis of the parameter-value-change instructing signal received, "meB" 200*b* updates the value of the corresponding parameter in the local current memory 201 (i.e., one of the parameters contained in the "Bin" current memory section). Then, "meB" 200*b* transmits the updated value of the parameter, i.e. "parameter value change result", to "dmix" 100. On the basis of the parameter value change result received, dmix" 100 updates the value of the corresponding parameter in the remote current memory ("Bin'") 102 of "meB" 200*b*. Then, on the basis of the updating, a visual indication of the parameter value is updated on the console section 60 of "dmix" 100. Similar operations are carried out in response to control operation of "Bout"; namely, if control operation of "Bout has been performed when "Master" is selected (i.e., "master" switch 78 and "Remo1" switch 76 are illuminated), the value of the corresponding parameter in the local current memory 201 (i.e., one of the parameters contained in the "Bout" current memory section) is changed in response to a parameter value change instruction given via the console section of "dmix" 100, and the parameter value change result is returned to "dmix" 100 so that it is reflected on the display on the console section of "dmix" 100.

In FIG. 13A, illustration of the remote current memory sections "Bin'" and "Aout'" corresponding to the input channels of "meB" and output channels of "meA", which are not the object of remote control by "dmix" 100 in "mode A", is omitted for clarity. In "mode A", as noted above, the mixing processing on the input channels of "meB" and output channels of "meA" (i.e., mixing processing on audio signals related to a succeeding performance) can be controlled from the PC (i.e., auxiliary operation section) 300 (see FIG. 5A etc.). Further, in FIG. 13B, illustration of the remote current memory sections "Ain'" and "Aout'" corresponding to the input channels of "meA" and output channels of "meA", which are not the object of remote control by "dmix" 100 in "mode B", is omitted for clarity. In "mode B", the mixing processing on the input channels and output channels of "meA" can be controlled from the PC 300 (see FIG. 5B etc.).

In the instant embodiment of the mixing system, as set forth above in relation to FIGS. 8, 11, 12, 13A and 13B, once operation is performed on the console section 60 of the mixer ("dmix") 100 when remote control is designated as the object of control (through operation of the "Remo1" switch 76 or "Remo2" switch 72), a control signal (change instructing signal) is transmitted to one of the engines ("meA" 200*a* or "meB" 200*b*) that is the object of control so that a parameter value in the local current memory 201 or 202 of the engine ("meA" 200*a* or "meB" 200*b*) is changed, and then the parameter value change result, indicative of the result of the parameter value change in the local current memory 201 or 202, is transmitted to "dmix" 100. In this way, the result of the parameter value change made in the engine ("meA" 200*a* or "meB" 200*b*), which is the object of control, can be reflected in the console section of "dmix" 100; here, the reflection in the "dmix" 100 includes updating of the visual indication of the corresponding parameter on the screen of the display 7 of the console section, updating of the display pertaining to the corresponding operator member (e.g., illumination of LEDs), control of the operating position of the corresponding electric fader 9, etc.

Figure 14:
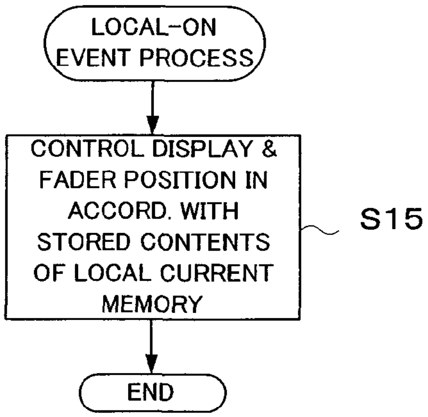
FIG. 14 is a flow chart showing an example operational sequence of a local-ON event process to be performed when an object of control by the mixer is to be switched from "remote" to "local"
Figure 15:
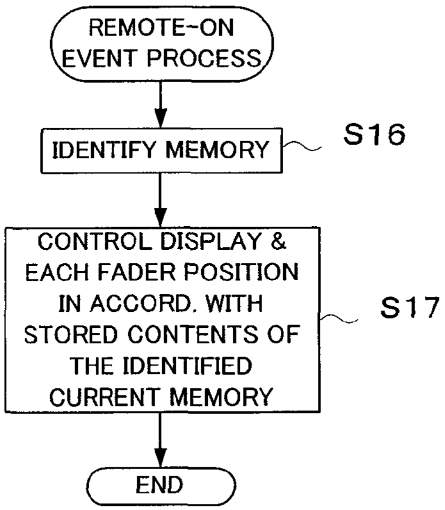
FIG. 15 is a flow chart showing an example operational sequence of a remote-ON event process to be performed when the object of control by the mixer is to be switched to "remote"

With reference to FIGS. 14 and 15, the following lines describe an object-of-control change process responsive to operation of any one of the object-of-control change switches 75-77. When the object of control has been changed from "Remo1" or "Remo2" to "Local", the mixer ("dmix") 100 updates the display on the console section 60 and performs electric control on the operating position of the electric fader 9 of each of the channel strips 70 and 71 in accordance with the stored contents of the local current memory 101 (step S15 of FIG. 14). When the object of control has been changed from "Local" to "Remo1" or "Remo2", "dmix" 100 identifies the remote current memory 102 or 103 storing parameters to be read out to the console section of "dmix" 100, at step S16 of FIG. 15. Then, at step S17, "dmix" 100 updates the display on the console section and performs electric control on the operating position of the electric fader 9 of each of the channel strips 70 and 71 in accordance with the stored contents of the remote current memory 102 or 103.

Thus, when the mixer ("dmix") 100 has changed the object of control, the instant embodiment of the mixing system allows the current parameter settings of a mixing apparatus, which becomes a new object of control, to be reflected in the control section 60 of "dmix" 100. Further, by providing the three current memories, i.e. local current memory 101, remote current memory 102 of "meB" 200*b* and remote current memory 103 of "meA" 200*a*, and by switching among the three current memories 101-103, display updating and switching operations responsive to the object-of-control change can be performed promptly.

Lastly, a description will be given about control for interlinking (interlocking), between mixing apparatus, of a scene store/recall function (i.e., scene store/recall interlocking function) performed in the instant embodiment of the mixing system. The "scene store/recall function" is a function for collectively reproducing settings of given mixing parameters by storing the current settings of parameters, retained in the current memory, into the scene memory as a set of scene data of a scene and reading out (recalling) the stored scene data from the scene memory to the current memory, as noted earlier.

Figure 16A:
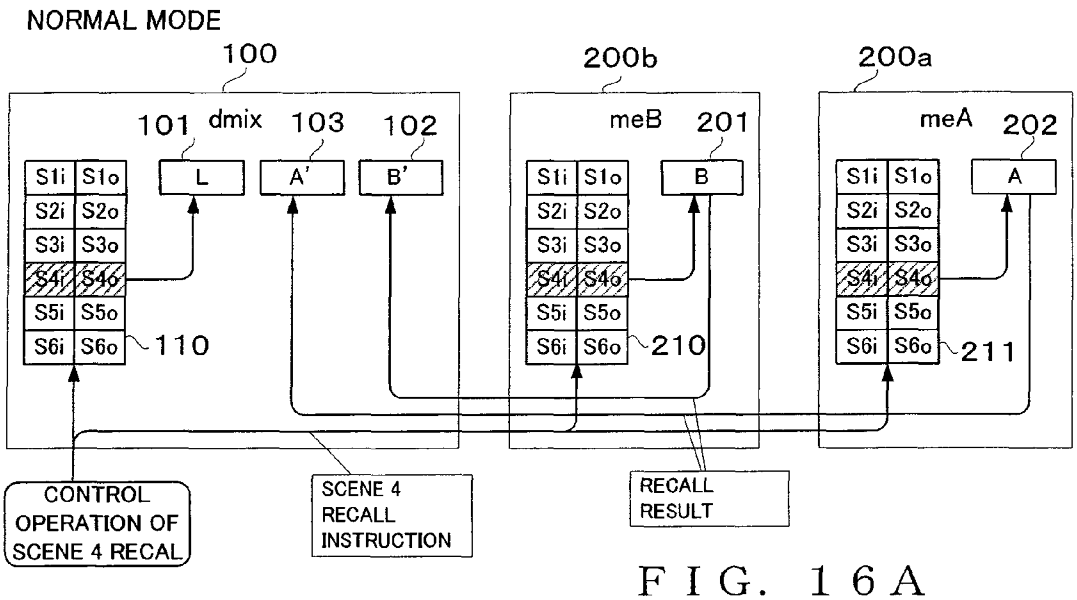
Figure 16B:
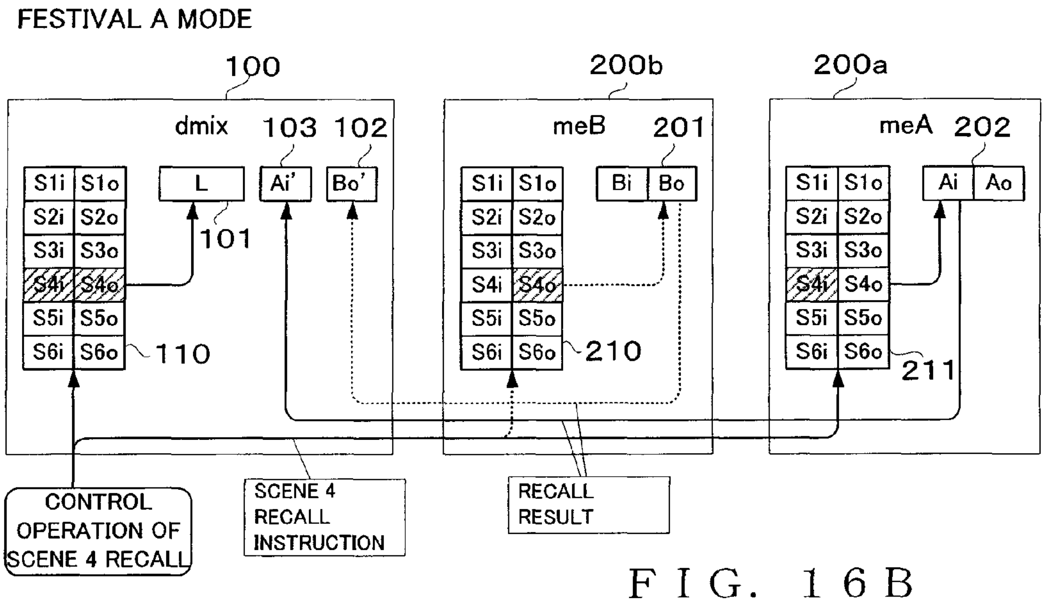

FIGS. 16A and 16B are diagrams explanatory of constructions of the scene memories and scene recall processes; more specifically, FIG. 16A is explanatory of the scene recall process in the normal mode, while FIG. 16B is explanatory of the scene recall process in the festival mode. As shown in FIGS. 16A and 16B, the scene memories 110, 210 and 211 are provided in the respective flash memories 12 and 14 of "dmix" 100, "meB" 200*b* and "meA" 200*a*. Each of the scene memories 110, 210 and 211 has stored therein a plurality of sets of scene data, representative of a plurality of scenes (six scenes in each of the illustrated examples), of the corresponding mixing apparatus. The plurality sets of scene data stored in each of the scene memories 110, 210 and 211 are assigned respective scene numbers "1"-"6" and managed with these scene numbers. Further, in the figures, the scene data related to the input channel group are each indicated with a suffix "i" (e.g., "S4*i*"), and the scene data related to the output channel group are each indicated with a suffix "o" (e.g., "S4*o*"). This is because, in some cases, only scene data related to the input channel group or only scene data related to the output channel group should be recalled in the festival mode, as will be later detailed. Therefore, in the instant embodiment, the scene data related to the input channel group and the scene data related to the output channel group are managed separately even in a single scene. Further, the reason why the scene memories 210 and 211 are provided in "meB" 200*b* and "meA" 200*a* having no console section is to allow these engines to be used even when the engines are not cascade-connected with the mixer 100. Further, the reason why "dmix" 100 includes only the remote current memories 103 and 102 but includes no remote scene memory is that 1) the scene memory is great in size and, even when a remote scene memory is provided in "dmix" 100, there can be achieved only a not-so-significant advantageous result that displays can be made promptly in "dmix" 100 at the time of scene recall with no change in the scene recall speed in "dmix" 100, and 2) if a remote scene memory of a great size is provided, a longer time would be required for a synchronizing operation (step S5) at the beginning of cascade connection.

With reference to the construction of the console section shown in FIG. 6, the following lines describe an operational sequence in which the user instructs storage or recall of a scene. First, once the user of "dmix" 100 designates a desired scene number using the number increment (UP) switch 88 and/or decrement (DOWN) switch 89, the designated scene number is displayed blinkingly on the scene number display section 87. Then, by operating the scene store switch 90, the user can instruct storing of the current settings of the individual mixing apparatus of the mixing system as a set of scene data of the designated scene number. Further, by operating the scene recall switch 91, the user can recall the scene data of the designated scene number to the individual mixing apparatus ("dmix", "meA" and meB") of the mixing system.

Figure 17:
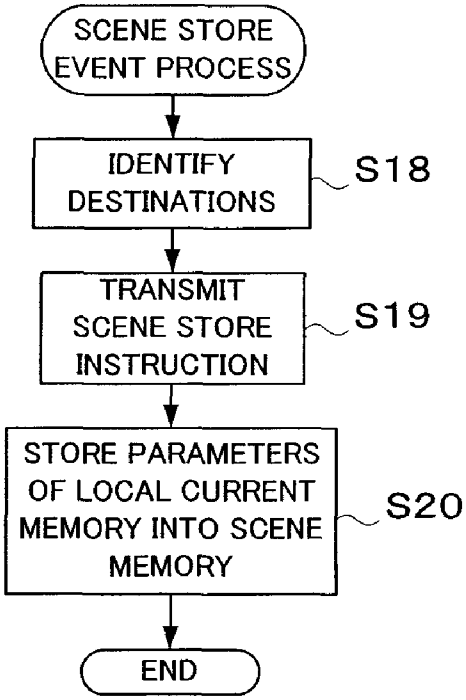
FIG. 17 is a flow chart showing an example operational sequence of a scene store event process performed by the mixer in the embodiment.

Next, with reference to a flow chart of FIG. 17, a description will be given about an example operational sequence of a process performed by the mixer ("dmix") 100 in response to a scene data store instruction given by the user. Once a scene store instruction event is generated in response to the user operating the scene store switch 90, "dmix" 100 identifies cascade (delivery)-destination mixing apparatus to which the scene store instruction is to be transmitted (i.e., cascade destinations of the scene store instruction) and identifies content of the scene store in the cascade-destination mixing apparatus, at step S18. Here, the "destinations of the scene store instruction" are mixing apparatus ("meA" 200*a* and "meB" 200*b*) where the scene store operation should be performed in an interlocked manner. Further, the "content of the scene store" is information indicating whether the scene to be stored in the cascade destinations is the stored contents of the current memory related to only the input channel group, the stored contents of the current memory related to only the output channel group or the stored contents of the current memories related to both of the input and output channel groups.

At step S19, "dmix" 100 transmits a scene store content instruction to the identified cascade-destination apparatus so as to cause the cascade-destination apparatus to store the content of the scene store with the user-designated scene number. Further, at step S20, "dmix" 100 stores in the scene memory 110 the current stored contents of the local current memory 101 as scene data of the user-designated scene number.

The cascade-destination mixing apparatus ("meA" 200*a* and "meB" 200*b*) receive the scene store content instruction transmitted from "dmix" 100 at step S18 above, and then, in response to the received scene store content instruction, the destination mixing apparatus store, in their respective scene memories 210 and 211, part (corresponding only to the input or output channel group) or whole of the current stored contents of the respective local current memories 201 and 202. In this way, the current stored contents of the respective local current memories can be stored in "dmix" 100, "meA" 200*a* and "meB" 200*b* as scene data of the same scene number. Namely, the scene store operation can be interlinked or interlocked among dmix" 100, "meA" 200*a* and "meB" 200*b*.

Figure 18:
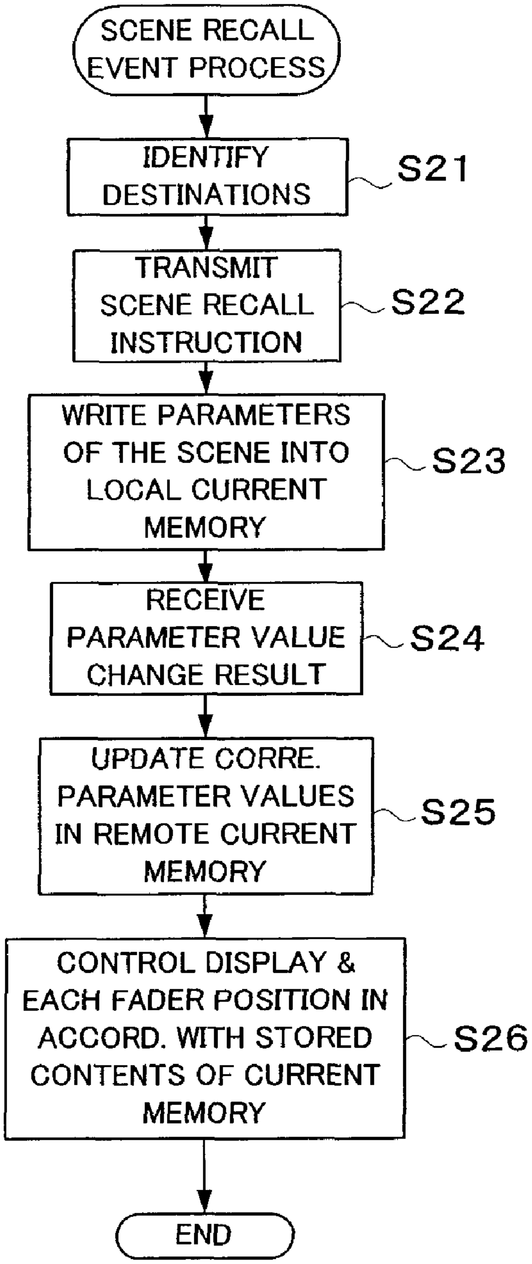
FIG. 18 is a flow chart showing an example operational sequence of a scene recall event process performed by the mixer in the embodiment.
Figure 19:
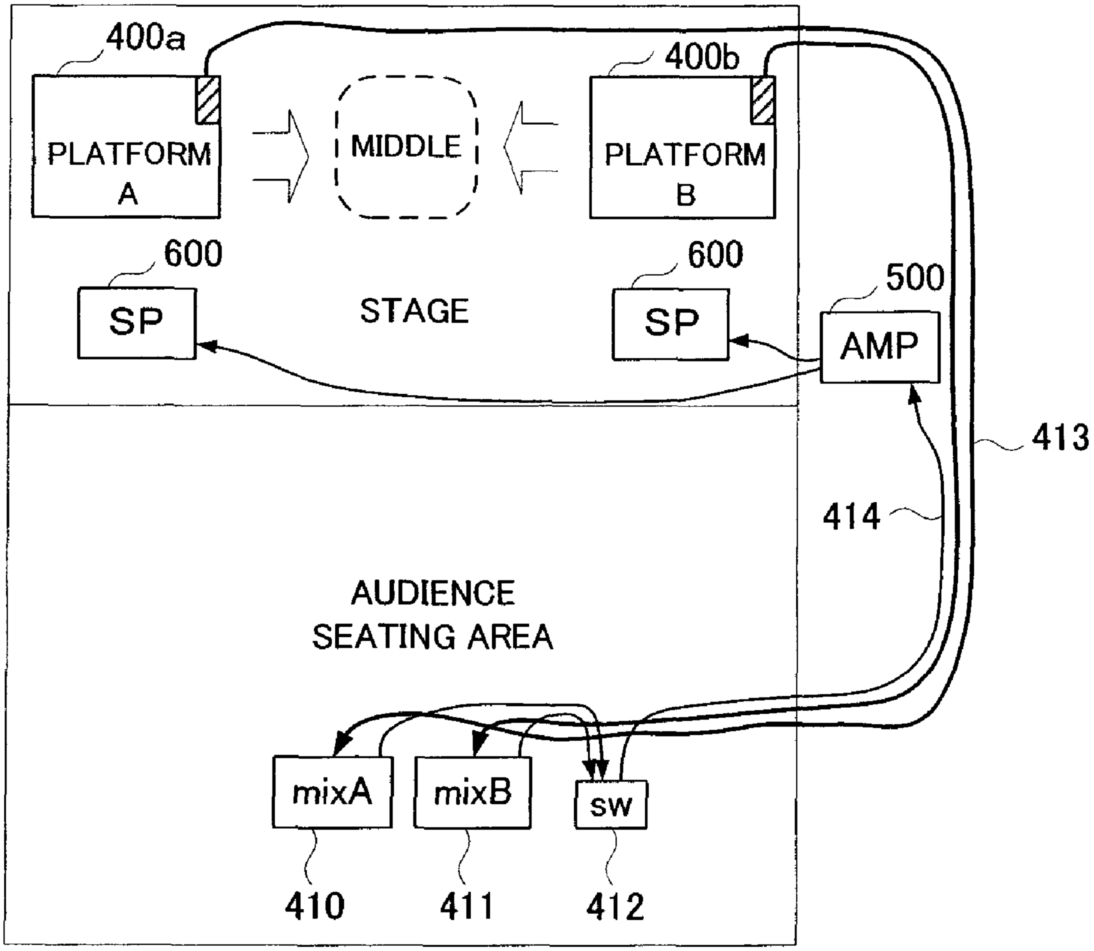
(PRIOR ART) FIG. 19
FIG. 19 is a block diagram showing a construction of a conventionally-shown PA system.

Next, with reference to a flow chart of FIG. 18 as well as FIGS. 16A and 16B, a description will be given about an example operational sequence of a process performed by the mixer ("dmix") 100 in response to a scene data recall instruction given by the user. Once a scene recall instruction event is generated in response to the user operating the scene recall switch 91, "dmix" 100 identifies cascade-destination mixing apparatus to which the scene recall instruction is to be transmitted (i.e., destinations of the scene recall instruction) and identifies content of the scene recall in the cascade-destination mixing apparatus, at step S21. Here, the "content of the scene recall" is information indicating whether the scene to be recalled in the cascade-destinations is of scene data related to only the input channel group, scene data related to only the output channel group or scene data related to both of the input and output channel groups.

At step S22, "dmix" 100 transmits a scene recall content instruction to the identified cascade-destination apparatus so as to cause the cascade-destination apparatus to recall the scene data of the user-designated scene number in accordance with the content of the scene recall instructed. In FIGS. 16A and 16B, there is shown a case where the scene data set of scene number "4" has been instructed to be recalled (i.e., "scene 4 recall instruction" has been given). At step S23, "dmix" 100 performs an operation for reading out scene data of the user-designated scene number from the scene memory 110 an then writing the read-out scene data into the local current memory 101. The stored contents of the local current memory 101, having been changed or updated with the read-out scene data, are reflected in the control of the signal processing control by the DSP array 4 and in the control of the display when the stored contents of the local current memory 101 have been read out to the console section 60 of "dmix" 100.

The cascade-destination mixing apparatus ("meA" 200*a* and "meB" 200*b*), as shown in FIGS. 16A and 16B, receive the "scene 4 recall instruction", read out the scene data of the designated scene number (4 in the illustrated example) from the respective scene memories 211 and 210 on the basis of the received "scene 4 recall instruction", and write the read-out scene data into the respective local current memories 202 and 201. The stored contents of the local current memories 202 and 201, having been updated with the read-out scene data, are reflected in the control of the signal processing control by the respective DSP arrays 16.

In the normal mode, as shown in FIG. 16A, the "scene 4 recall instruction" to "meA" 200*a* and "meB" 200*b* includes a content instruction instructing scene data S4*i* and S4*o* related to both the input channel group and the output channel group. Thus, in "meA" 200*a* and "meB" 200*b*, the scene data of S4*i* and S4*o* are recalled from the scene memories 211 and 210 to the respective local current memories 202 and 201.

In the festival mode, as shown in FIG. 16B, the "scene 4 recall instruction" to "meB" 200*b* includes a content instruction instructing the scene data S4*o* related to only the output channel group, and the "scene 4 recall instruction" to "meA" 200*a* includes a content instruction instructing the scene data S4*i* related to only the input channel group. Thus, in the festival mode, "meB" 200*b* reads out and recalls the scene data S4*o* from the scene memory 210 to the local current memory 201 (current memory section Bo), while "meA" 200*a* reads out and recalls the scene data S4*i* from the scene memory 211 to the local current memory 202 (current memory section "Ai").

Once the stored contents of the local current memory 202 or 201 are updated by the scene recall, each of "meA" 200*a* and "meB" 200*b* returns the updated results of the individual parameter values ("recall results") to "dmix" 100. In the normal mode shown in FIG. 16A, the entire stored contents (whole of one scene) of the local current memories 202 and 201 are returned, as the "recall results", from "meA" 200*a* and "meB" 200*b* to "dmix" 100. In the festival mode shown in FIG. 16B, the stored contents (only part of one scene related to only the output channel group) of the local current memory 201 (current memory section Bo) are returned, as the "recall results", from "meB" 200*b* to "dmix" 100, while the stored contents (only part of one scene related to only the input channel group) of the local current memory 202 (current memory section Ai) are returned, as the "recall results", from "meA" 200*a* to "dmix" 100.

Referring back to FIG. 18, "dmix" 100 receives the "recall results" (i.e., updated parameter settings) at step S24, and then updates, at step S25, the corresponding parameter values in the remote current memories 102 and 103 on the basis of the received "recall results" (updated parameter settings). More specifically, in the normal mode shown in FIG. 16A, the stored contents of the remote current memory section B' of the memory 102 corresponding to "meB" 200*b* are updated on the basis of the recall results from "meB" 200*b*, while the stored contents of the remote current memory A' corresponding to "meA" 200*a* are updated on the basis of the recall results from "meA" 200*a*. In the festival mode shown in FIG. 16B, on the other hand, the stored contents of the output-channel-related remote current memory section Bo' of the current memory 102 corresponding to "meB" 200*b* are updated on the basis of the recall results from "meB" 200*b*, while the stored contents of the input-channel-related remote current memory section "Ai'" of the current memory 103 corresponding to "meA" 200*a* are updated on the basis of the recall results from "meA" 200*a*.

Then, at step S26, "dmix" 100 performs display updating control on the console section 60 and electric control on the operating positions of the electric faders 9 of the individual channel strips 70 and 71 on the basis of the stored contents of any one of the local current memory 101 and remote current memories 102 and 103 which corresponds to the current object of control by the console section 60.

Thus, the instant embodiment of the mixing system allows the recall results of cascade-destination mixing apparatus ("meA" 200*a* and "meB" 200*b*), which are other mixing apparatus than "dmix" 100 in the system, to be reflected in the console section of "dmix" 100 (i.e., screen display, parameter setting display, operating positions of the operator members, etc. on the console section 60), by causing the cascade-destination mixing apparatus ("meA" 200*a* and "meB" 200*b*) to perform the scene recall in response to the scene recall instruction given from "dmix" 100 and to return the scene recall results to "dmix" 100.

The scene recall interlocking control has been explained above, with reference to FIGS. 16A and 16B, on the assumption that a "scene recall link parameter" for setting as to whether or not the cascade-destination engines ("meA" 200*a* and "meB" 200*b*) should perform a scene recall in interlocked relation with a scene recall of the mixer ("dmix") 100 is set ON in each of the engines ("meA" 200*a* and "meB" 200*b*). Namely, each engine where the "scene recall link parameter" is set OFF is not interlocked with a scene recall instructed via the mixer ("dmix") 100. Let it also be assumed here that, when a scene recall has been performed independently in the engine where the "scene recall link parameter" is set OFF, results of updating, by the scene recall, of the stored contents of the current memory (i.e., recall results) are returned to "dmix" 100 and then "dmix" 100 updates the remote current memory of that engine on the basis of the returned recall results.

In the case where the PC 300 is connected to the other I/O sections 21 of the engines 200*a* and 200*b* or to the other I/O 10 of the mixer 100 so that the engines 200*a* and 200*b* or mixer 100 can be remote-controlled from the PC 300, similar operations to those explained above in relation to FIGS. 8, 13 and 16A and 16B are performed. In such a case, the PC 300 includes two remote current memories for remote-controlling the current memory 101 of the mixer 100 and for remote-controlling the local current memories 201 and 202 of the engines 200*b* and 200*a*.

In the case where the stored contents of the current memory 201 or 202 of the mixer 100 or engine 200*b* or 200*a* are updated in response to operation on the console section 60 of the mixer 100, the "parameter value change result" are transmitted to the PC 300 as well, so that the corresponding remote current memory within the PC 300 too is updated.

When operation (e.g., control operation of "Ain") has been performed on an operation screen of the PC 300, a parameter value change instruction, corresponding to the operation, is transmitted, for example, to the engine 200*a* via the other I/O 21 or 10 and cascade connection, so that the corresponding parameter stored in the current memory of the engine 200*a* is updated. Further, the "parameter value change result" is transmitted to the PC 300 and mixer 100, and the PC 300 and mixer 100, having received the "parameter value change result", update the stored contents of the corresponding current memories provided therein.

In the normal mode, the PC 300 can set, as its object of remote control, all of the current memories of the mixer 100 and engines 200*b* and 200*a*, while, in the festival mode, the PC 300 can set, as its object of remote control, only limited parts of the current memories which are not the object of control by the console section of the mixer 100. Namely, in "mode A" of the festival mode, the PC 300 can set, as its object of remote control, the current memory section Bin of the engine 200*b* and current memory section Aout of the engine 200*a*, while, in "mode B" of the festival mode, the PC 300 can set, as its object of remote control, the current memory sections Ain and Aout of the engine 200*a*.

According to the instant embodiment of the mixing system of the invention, as set forth above, the mixing processing of the mixer engines ("meA" and "meB") 200*a* and 200*b*, cascade-connected with the mixer ("dmix") 100, is remote-controlled from the console section 60 of the mixer 100, and the result of the control is reflected in the console section 60 of the mixer 100; thus, the result of the control can be confirmed via the console section of the mixer 100. When the object of control has been switched or changed, the current stored contents of the current memory of the mixing apparatus selected as the new object of control (e.g., local current memory 101 or remote current memories 102 and 103) can be reflected in the console section 60 of the mixer 100. Also, when set values (settings) of parameters stored in any of the mixer engines 200*a* and 200*b*, cascade-connected with the mixer ("dmix") 100, have been updated by the scene recall control, the updated results (namely, current parameter settings) can be reflected in the console section 60 of the mixer 100. Thus, the instant embodiment of the mixing system can achieve a superior advantageous benefit that, while the current parameter settings (stored contents of the current memory) of the mixing processing of one engine (first mixing apparatus), selected as the object of remote control, are being reflected in the console section 60, the mixing processing of another engine (second mixing apparatus) can be remote-controlled.

Further, the user can use the channel strips 70 and 71, provided on the console section 60 of the mixer 100, to adjust channel-specific mixing processing parameters of the other mixing apparatus ("meA" 200*a* and "meB" 200*b*) in generally the same manner as when adjusting mixing processing parameters of the mixer 100. Thus, the instant embodiment of the mixing system can achieve another superior advantageous benefit that all of the mixing processing in the mixing system can be controlled through unified operation.

Further, in the festival mode, there can be achieved an advantageous benefit that, while audio signals for a current performance input to one of the engines (i.e., "meA" 200*a* or "meB" 200*b*) are being subjected to mixing control, in response to operation via the console section 60 of the mixer 100, and output to the main output path (sounded through the main speaker), audio signals for a succeeding performance can be input to the other engine (i.e., "meB" 200*b* or "meA" 200*a*), subjected to mixing processing and output to the auxiliary output path (monitored or confirmed by the headphone set). Furthermore, by switching between "mode A" and "mode B" in accordance with a destination ("meA" 200*a* or "meB" 200*b*) of the audio signals for the current performance, the instant embodiment allows two different mixing processing to be performed efficiently by use of the single mixer.

The embodiment of the mixing system has been described above as comprising one mixer 100 provided with the console section 60 and engines 200*a* and 200*b* with no console section and constructed in such a manner that the engines 200*a* and 200*b* with no console section are remote-controlled from the single mixer 100 with the console section 60. Alternatively, the object of remote control may be a mixer provided with a console section rather than the mixer engine. Further, the number of the mixing apparatus constituting the mixing system may be other than three.

Further, in the embodiment of the mixing system, as described above in relation to FIG. 3, the mixer ("dmix") 100 and engines 200*a* and 200*b* ("meA" and "meB" 200*a* and 200*b*) are substantially identical to one another in signal processing construction for mixing processing (such as, the number of input channels, the number of mixing buses, the number of output channels, the number of effects, etc.). However, the present invention is not so limited; for example, the number of input channels provided in each of the engines may be greater or smaller than that provided in the engine. Similarly, the number of input channels provided in each of the engines may be greater or smaller than that provided in the engine. Further, in a case where the number of mixing buses provided in a given mixing apparatus is greater than that provided in another mixing apparatus (i.e., the number of mixing buses is not equal between the mixing apparatus), it is sufficient that an ultimate output of each extra mixing bus of the given mixing apparatus, which has no counterpart in the other mixing apparatus, be output only from an output channel of the given mixing apparatus without the extra mixing bus being cascade-connected with any mixing bus of the other mixing apparatus.

Furthermore, it has been described above in relation to FIG. 4 that, in the normal mode, ultimate outputs of the mutually-connected mixing buses can be output from any of the mixing apparatus ("dmix" 100, "meA" 200A and "meB" 200B), the ultimate outputs need not necessarily be coupled to the output channels of all of the mixing apparatus, and it is sufficient if the ultimate outputs can be output from any one of the mixing apparatus (e.g., "meB" 200*b* connected to the sound system).

Furthermore, it has been described above that, in executing the cascade connection in the normal mode shown in FIG. 4, the mixer 100 provided with the console section 60 is located at a predetermined position for a "cascade master"; however, the instant embodiment may be carried out with no problem even if the mixer 100 is located at a position for a "cascade slave". The difference between the cascade master and the cascade slave is merely that the cascade master transmits a cascade signal while the cascade slave receives the cascade signal, and thus, even where the mixer 100 is located at a position of a "cascade slave", the mixing processing of another mixing apparatus can be remote-controlled via the console section 60 of the mixer 100. Note that, in a case where no engine 200 is cascade-connected with the mixer 100, the mixer 100 can operate independently so as to control the mixing processing by its own signal processing section 4 in response to operation on the console section 60.

Furthermore, whereas the embodiment of the mixing system has been described above in relation to the case where the auxiliary operation section in the festival mode is implemented by the PC 300, the auxiliary operation section may be implemented by other than a PC; for example, the auxiliary operation section may be implemented by a suitable user interface, such as a PDA or small-size, dedicated remote control panel. Moreover, the auxiliary operation section (e.g., PC 300) and the engine 200 may be interconnected by wireless connection (e.g., by a wireless LAN or wireless USB) rather than by wired connection. In such a case, if a radio wave of necessary intensity can reach the auxiliary operation section and engine 200, a wireless connection I/O need not be positioned near the auxiliary operation section (e.g., PC 300); for example, the mixer 100 may be provided with a wireless connection I/O.

Furthermore, whereas FIGS. 5A and 5B show example constructions where the headphone set 62 is connected to the monitoring output section 38*b* of "meB" 200*b* to monitor signals of the auxiliary CUE buses 54, the present invention is not so limited, and the headphone set 62 may be connected to the monitoring output section 38*b* of "meA" 200*a* to monitor signals of the auxiliary CUE buses 54. Further, the auxiliary output in the festival mode may be provided in the auxiliary operation section (e.g., PC 300) rather than in the mixer engine. In such a case, control and audio signals may be together sent to the connection line connecting between the auxiliary operation section (PC 300) and the engine 200 so that the audio signals can be output from the audio output section of the auxiliary operation section (PC 300). For example, in the case where a USB is employed as the connection line connecting between the auxiliary operation section (PC 300) and the engine 200, audio signals of the auxiliary output can be delivered to the auxiliary operation section (PC 300) via the connection line. Furthermore, in the case where the connection line connecting between the auxiliary operation section (PC 300) and the engine 200 comprises an Ethernet device, a well-known audio signal delivery technique, such as the VOIP (Voice Over Internet Protocol), may be employed.

Furthermore, whereas the examples of FIGS. 5A and 5B are arranged such that the output path of the mixer engine ("meB") function as the main output (coupling the sound system to "meB"), any of the signal output paths of the cascade-connected mixer and mixer engines may function as the main output. Thus, the main signal output path in each of the festival "A" mode and festival "B" mode (i.e., which of the output channels of the mixer or the output channels of the mixer engine the ultimate bus output signals should be supplied to) is not limited to that employed in the above-described embodiment; the main signal output path in each of the festival "A" mode and festival "B" mode may be set as desired by the user.

Furthermore, the console section 60 of "dmix" 100 shown in FIG. 6 has been described above in relation to the case where the mode change switches 72-74, object-of-control change switches 75-77 and layer change switches 78-80 are mechanical switches provided on the console section 60, these switches 72-80 may be virtual switches in the form of GUI components (images of switches) operable via the screen of the display 7.

This application is based on, and claims priority to, JP PA 2007-061761 filed on 12 Mar. 2007. The disclosure of the priority application, in its entirety, including the drawings, claims, and the specification thereof, is incorporated herein by reference.

What is claimed is:

1. A mixing system including a plurality of cascaded mixing apparatus, said mixing system comprising:

a main mixing apparatus including an main operation section for receiving operation by a user;

a first mixing apparatus to which are inputted audio signals from a first input source;

a second mixing apparatus to which are inputted audio signals from a second input source;

an auxiliary operation section for receiving operation by a user different from the operation received via said main operation section;

a main output section that outputs an audio signal to a sound system;

an auxiliary output section that outputs a confirming audio signal;

a mode selection section that selects either one of a first control mode for causing the signal of said first input source to be outputted through said main output section and a second control mode for causing the signal of said second input source to be outputted through said main output section;

a first control section that, in said first control mode, controls mixing processing of said first mixing apparatus for mixing the audio signals, inputted from the first input source, in response to operation received via said main operation section, to thereby cause a result of the controlled mixing processing of said first mixing apparatus to be outputted through said main output section and controls mixing processing of said second mixing apparatus for mixing the audio signals, inputted from the second input source, in response to operation received via said auxiliary operation section, to thereby cause a result of the controlled mixing processing of said second mixing apparatus to be outputted through said auxiliary output section; and a second control section that, in said second control mode, controls the mixing processing of said second mixing apparatus for mixing the audio signals, inputted from the second input source, in response to operation received via said main operation section, to thereby cause a result of the controlled mixing processing of said second mixing apparatus to be outputted through said main output section and controls the mixing processing of said first mixing apparatus for mixing the audio signals, inputted from the first input source, in response to operation received via said auxiliary operation section, to thereby cause a result of the controlled mixing processing of said first mixing apparatus to be outputted through said auxiliary output section.

2. The mixing system as claimed in claim 1 wherein each of said main mixing apparatus, said first mixing apparatus and said second mixing apparatus performs mixing processing for controlling characteristics of audio signals, input per channel, and then mixing resultant controlled output signals of individual ones of the channels via a mixing bus, which further comprises a bus connection control section that, in said first control mode, interconnects a mixing bus of said main mixing apparatus and a mixing bus of said first mixing apparatus and that, in said second control mode, interconnects the mixing bus of said main mixing apparatus and a mixing bus of said second mixing apparatus, wherein said first control section controls the mixing processing of said main mixing apparatus and said first mixing apparatus in response to operation received via said main operation section, and said first control section also performs control to cause an ultimate output signal of the mixing buses of said main mixing apparatus and said first mixing apparatus, interconnected by said bus connection control section, to be outputted through said main output section, and wherein said second control section controls the mixing processing of said main mixing apparatus and said second mixing apparatus in response to operation received via said main operation section, and said second control section also performs control to cause an ultimate output signal of the mixing buses of said main mixing apparatus and said second mixing apparatus, interconnected by said bus connection control section, to be outputted through said main output section.

3. The mixing system as claimed in claim 1 which further comprises an object-of-control designation section that designates either one of local control and remote control as an object of control according to the operation received via said main operation section, and wherein, when the local control is designated, the mixing processing of said main mixing apparatus is performed in response to the operation received via said main operation section, but, when the remote control is designated, either one of the mixing processing of said first mixing apparatus and the mixing processing of said second mixing apparatus is performed, in response to operation received via said main operation section, in accordance with the control mode selected via said mode selection section.

4. The mixing system as claimed in claim 1 wherein said main output section includes an audio signal output channel provided in any one of said main mixing apparatus, said first mixing apparatus and said second mixing apparatus, and wherein, in each of said first control mode and said second mode, a characteristic of an audio signal supplied to the audio signal output channel can be controlled in response to the operation received via said main operation section.

5. The mixing system as claimed in claim 1 which further comprises:

a main monitoring bus connected to a main monitoring output section provided in said main mixing apparatus;

an auxiliary monitoring bus connected to an auxiliary monitoring output section provided in said first mixing apparatus or said second mixing apparatus;

a CUE instruction section that issues CUE instructions via said main operation section and said auxiliary operation section;

a main CUE control section that, in response to the CUE instruction via said main operation section, outputs an audio signal of said first mixing apparatus from said main monitoring bus to said main monitoring output section when said first control mode is selected, but outputs an audio signal of said second mixing apparatus from said main monitoring bus to said main monitoring output section when said second control mode is selected; and an auxiliary CUE control section that, in response to the CUE instruction via said auxiliary operation section, outputs the audio signal of said second mixing apparatus from said auxiliary monitoring bus to said auxiliary monitoring output section when said first control mode is selected, but outputs the audio signal of said first mixing apparatus from said auxiliary monitoring bus to said auxiliary monitoring output section when said second control mode is selected.

6. The mixing system as claimed in claim 1 wherein each of said first mixing apparatus and said second mixing apparatus comprises a mixer engine that includes no operation section for receiving operation by a user and that performs mixing processing for mixing input audio signals in accordance with a control signal given from outside the mixer engine.

7. The mixing system as claimed in claim 1 wherein said auxiliary operation section comprises a personal computer having installed therein an application program for controlling said first mixing apparatus and said second mixing apparatus.

8. A mixing control method for a mixing system including a plurality of cascaded mixing apparatus, said mixing system including: a main mixing apparatus including an main operation section for receiving operation by a user; a first mixing apparatus to which are inputted audio signals from a first input source; a second mixing apparatus to which are inputted audio signals from a second input source; an auxiliary operation section for receiving operation by a user different from the operation received via said main operation section; a main output section that outputs an audio signal to a sound system; an auxiliary output section that outputs a confirming audio signal, said mixing control method comprising:

a step of selecting either one of a first control mode for causing the signal of said first input source to be outputted through the main output section and a second control mode for causing the signal of said second input source to be outputted through the main output section;

a step of, when said first control mode is selected, controlling mixing processing of said first mixing apparatus for mixing the audio signals, inputted from the first input source, in response to operation received via the main operation section, to thereby cause a result of the controlled mixing processing of said first mixing apparatus to be outputted through the main output section and controlling mixing processing of said second mixing apparatus for mixing the audio signals, inputted from the second input source, in response to operation received via the auxiliary operation section, to thereby cause a result of the controlled mixing processing of said second mixing apparatus to be outputted through the auxiliary output section; and a step of, when said second control mode is selected, controlling the mixing processing of said second mixing apparatus for mixing the audio signals, inputted from the second input source, in response to operation received via the main operation section, to thereby cause a result of the controlled mixing processing of said second mixing apparatus to be outputted through the main output section and controlling the mixing processing of said first mixing apparatus for mixing the audio signals, inputted from the first input source, in response to operation received via the auxiliary operation section, to thereby cause a result of the controlled mixing processing of said first mixing apparatus to be outputted through the auxiliary output section.

9. A computer-readable storage medium containing a program for causing a computer to perform a mixing control procedure for a mixing system including a plurality of cascaded mixing apparatus, said mixing system including: a main mixing apparatus including an main operation section for receiving operation by a user; a first mixing apparatus to which are inputted audio signals from a first input source; a second mixing apparatus to which are inputted audio signals from a second input source; an auxiliary operation section for receiving operation by a user different from the operation received via said main operation section; a main output section that outputs an audio signal to a sound system; an auxiliary output section that outputs a confirming audio signal, said mixing control procedure comprising:

a step of selecting either one of a first control mode for causing the signal of said first input source to be outputted through the main output section and a second control mode for causing the signal of said second input source to be outputted through the main output section;

a step of, when said first control mode is selected, controlling mixing processing of said first mixing apparatus for mixing the audio signals, inputted from the first input source, in response to operation received via the main operation section, to thereby cause a result of the controlled mixing processing of said first mixing apparatus to be outputted through the main output section and controlling mixing processing of said second mixing apparatus for mixing the audio signals, inputted from the second input source, in response to operation received via the auxiliary operation section to thereby cause a result of the controlled mixing processing of said second mixing apparatus to be outputted through the auxiliary output section; and a step of, when said second control mode is selected, controlling the mixing processing of said second mixing apparatus for mixing the audio signals, inputted from the second input source, in response to operation received via the main operation section, to thereby cause a result of the controlled mixing processing of said second mixing apparatus to be outputted through the main output section and controlling the mixing processing of said first mixing apparatus for mixing the audio signals, inputted from the first input source, in response to operation received via the auxiliary operation section, to thereby cause a result of the controlled mixing processing of said first mixing apparatus to be outputted through the auxiliary output section.

* * * * *